United States Patent
Nishiwaki et al.

(10) Patent No.: US 10,983,377 B2
(45) Date of Patent: Apr. 20, 2021

(54) LIQUID CRYSTAL DISPLAY AND PRESSURE-SENSITIVE ADHESIVE SHEET

(71) Applicant: NITTO DENKO CORPORATION, Ibaraki (JP)

(72) Inventors: Masataka Nishiwaki, Ibaraki (JP); Kazuki Minoura, Ibaraki (JP); Kenta Jozuka, Ibaraki (JP); Naohiro Kato, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/576,898

(22) Filed: Sep. 20, 2019

(65) Prior Publication Data

US 2020/0096810 A1 Mar. 26, 2020

(30) Foreign Application Priority Data

Sep. 25, 2018 (JP) .............................. JP2018-178820

(51) Int. Cl.
  *G02F 1/1333* (2006.01)
  *C09J 7/38* (2018.01)
  *G02F 1/1335* (2006.01)

(52) U.S. Cl.
  CPC .......... *G02F 1/133308* (2013.01); *C09J 7/38* (2018.01); *G02F 1/133512* (2013.01); *G02F 1/133331* (2021.01)

(58) Field of Classification Search
None
See application file for complete search history.

(56) References Cited

U.S. PATENT DOCUMENTS

| | | | | |
|---|---|---|---|---|
| 2007/0218276 A1* | 9/2007 | Hiramatsu | ............... | C09J 7/385 428/354 |
| 2007/0243341 A1* | 10/2007 | Yokoyama | .............. | B32B 27/20 428/1.1 |
| 2008/0311369 A1* | 12/2008 | Yokoyama | ................ | B32B 7/12 428/220 |
| 2010/0027234 A1* | 2/2010 | Nakagawa | ........ | G02F 1/133308 361/813 |
| 2010/0060816 A1* | 3/2010 | Fukai | ................ | G02F 1/133615 349/58 |
| 2010/0143685 A1* | 6/2010 | Nakayama | ................. | C09J 7/26 428/220 |
| 2013/0017389 A1* | 1/2013 | Tamura | ..................... | C09J 7/26 428/314.4 |

(Continued)

FOREIGN PATENT DOCUMENTS

JP  2013-087246 A  5/2013
JP  2013-166891 A  8/2013

(Continued)

*Primary Examiner* — Ryan Crockett
(74) *Attorney, Agent, or Firm* — Sughrue Mion, PLLC

(57) ABSTRACT

Provided is a PSA sheet that can be processed with excellent precision while providing excellent light-blocking properties in an in-plane direction and in the thickness direction in an embodiment where the support substrate has a limited thickness. The PSA sheet has a support substrate having a thickness less than 75 μm and a PSA layer placed at least on one face of the support substrate. The PSA sheet has light transmittances of 0.04% or lower in XY and Z directions thereof.

18 Claims, 2 Drawing Sheets

(56) References Cited

U.S. PATENT DOCUMENTS

| | | | |
|---|---|---|---|
| 2013/0101842 A1* | 4/2013 | Yoshida | C09J 7/29 |
| | | | 428/354 |
| 2013/0216778 A1* | 8/2013 | Yoshida | C09J 133/08 |
| | | | 428/141 |
| 2014/0044915 A1* | 2/2014 | Niwa | C09J 133/08 |
| | | | 428/80 |
| 2018/0298239 A1* | 10/2018 | Kouno | C09J 11/08 |
| 2020/0123420 A1* | 4/2020 | Morioka | C09J 7/385 |
| 2020/0123421 A1* | 4/2020 | Morioka | C09D 133/06 |
| 2020/0142255 A1* | 5/2020 | Kitagawa | G02B 5/30 |

FOREIGN PATENT DOCUMENTS

| | | | |
|---|---|---|---|
| JP | 2015-083660 A | | 4/2015 |
| JP | 2017-052835 A | | 3/2017 |
| JP | 2017-057375 | * | 3/2017 |
| JP | 2017-057375 A | | 3/2017 |
| JP | 2018-002898 A | | 1/2018 |

* cited by examiner

LIQUID CRYSTAL DISPLAY AND PRESSURE-SENSITIVE ADHESIVE SHEET

CROSS-REFERENCE

The present application claims priority to Japanese Patent Application No. 2018-178820 filed Sep. 25, 2018; the entire content of which is incorporated herein by reference.

BACKGROUND OF THE INVENTION

1. Field of the Invention

The present invention relates to a liquid crystal display and a pressure-sensitive adhesive sheet.

2. Description of the Related Art

In general, pressure-sensitive adhesive (PSA) exists as a soft solid (a viscoelastic material) in a room temperature range and has a property to adhere easily to an adherend with some pressure applied. With such properties, PSA is widely used for purposes such as bonding, fixing and protecting components inside portable electronic devices such as cell phones. For instance, in portable electronic devices, light-blocking PSA sheets are used for purposes such as preventing light leakage from light sources such as backlight modules. Literatures related to this type of art include Japanese Patent Application Publication Nos. 2013-87246, 2013-166891, 2015-83660, 2017-57375 and 2018-2898, each disclosing a PSA sheet having a black color printed layer on one face of a resin film substrate; and Japanese Patent Application Publication No. 2017-52835 disclosing a single sided adhesive sheet laminated on a graphite sheet.

SUMMARY OF THE INVENTION

Conventionally, thinner and lighter portable electronic devices are in demand. In addition, in portable electronic devices, much importance tends to be placed on having bigger screens (larger display areas) and on design features. To prevent degradation of mobility with installation of a bigger screen or to bring about increased freedom of design, etc., narrower PSA sheets are desired. Light-blocking PSA sheets used in these applications tend to be made thinner and narrower. However, a thinner and narrower light-blocking PSA sheet also means a decrease in light-transmitting distance which accompanies degradation of light-blocking properties. Conventionally, light-blocking properties have been required mainly in the thickness direction of the PSA sheet; and therefore, such properties would be obtained by means such as placing a black color printed layer in the PSA sheet. However, in an application where the PSA sheet is made narrower, light-blocking properties are necessary in in-plane directions of the PSA sheet to prevent light leakage through its narrow segment. For instance, in Japanese Patent Application Publication No. 2017-57375, light leakage through a narrow edge face is inhibited by decreasing the light transmittance with a colorant added to the PSA layer. Recently, yet a higher level of light-blocking performance is required. For instance, in Japanese Patent Application Publication No. 2017-57375, among the species with low light transmittances at passing grades, with respect to those having light transmittance values smaller by one digit, they show notable differences in light-blocking properties.

The PSA sheet is made narrower by means such as punching, to obtain sufficient precision of processing, it is desirable to use a support substrate such as resin film. However, in a space with a limited thickness inside a thin electronic device and the like, placement of the support substrate leads to a limitation to the PSA layer's thickness that may affect the adhesive properties. When a colorant is included in the PSA layer to obtain light-blocking properties in in-plane directions as in Japanese Patent Application Publication No. 2017-57375, adhesive properties are compromised, more than in a colorant-free type. Thus, it is desirable to minimize the support substrate's thickness as much as possible.

The present invention has been made in view of these circumstances with an objective to provide a PSA sheet that can be processed with excellent precision while providing excellent light-blocking properties in an in-plane direction and in the thickness direction in an embodiment where the support substrate has a limited thickness.

The present description provides a PSA sheet that has a support substrate having a thickness less than 75 μm and a PSA layer placed at least on one face of the support substrate. The PSA sheet has XY-directional and Z-directional light transmittances of 0.04% or lower. Here, XY direction of the PSA sheet refer to a direction n included in the plane of the pressure-sensitive adhesive sheet, which can be referred to as an X direction being an arbitrary direction along the plane of the PSA sheet and a Y direction being the direction along the plane of the PSA sheet that orthogonally intersects with the X direction; and the Z direction refers to the direction (thickness directions) running through the thickness of the PSA sheet, which is also the direction that orthogonally intersects with XY direction (in-plane direction). The PSA sheet in this embodiment can be processed with excellent precision because it has the support substrate. In addition, because the XY-directional and Z-directional light transmittances of the PSA sheet are limited to or below 0.04%, excellent light-blocking properties can be obtained in an in-plane direction and in the thickness direction of the PSA sheet.

In a preferable embodiment, the XY-directional light transmittance is 0.01% or lower. The PSA sheet satisfying this property has excellent light-blocking properties particularly in in-plane directions. For instance, light leakage in in-plane directions of the PSA sheet is sufficiently prevented even it is made narrower.

In a preferable embodiment, the Z-directional light transmittance is 0.01% or lower. The PSA sheet satisfying this property has excellent light-blocking properties particularly in the thickness direction.

In a preferable embodiment of the PSA sheet disclosed herein, the Z-directional light transmittance of the support substrate is 5.0% or lower and the Z-directional light transmittance of the PSA layer is 4.0% or lower. When the support substrate and the PSA layer have light transmittances of the prescribed values or lower, light-blocking properties can be preferably obtained in the in-plane and thickness directions.

In a preferable embodiment, the support substrate comprises a black colorant. This can preferably bring about a support substrate having reduced XYZ-directional light transmittances. From the standpoint of the precision of processing and light-blocking properties, the support substrate is more preferably a resin film substrate comprising a black colorant. In another preferable embodiment, the PSA layer comprises a black colorant. By this, the PSA layer can be preferably obtained with a reduced light transmittance. With the inclusion of black colorant in both the support substrate and the PSA layer, excellent light-blocking properties can be preferably obtained according to the art disclosed herein.

In a preferable embodiment of the PSA sheet disclosed herein, the PSA layer has a thickness of 1.5 μm to 40 μm. When the PSA layer's thickness is 1.5 μm or greater, the adhesive properties such as adhesive strength and impact resistance tend to increase. When the PSA layer has light-blocking properties, the Z-directional light transmittance of the PSA sheet can be further decreased. In addition, with the thickness of 40 μm or less, the PSA sheet can be made thinner.

With the excellent light-blocking properties in the in-plane and thickness directions, the PSA sheet disclosed herein is preferably used in an electronic device having a luminous component, for instance, a liquid crystal display (LCD) device including a backlight unit as having both adhesive means and light-blocking properties.

For use in portable electronic devices, the PSA sheet can be used after processed into frame shapes and various shapes with narrow widths corresponding to the shapes of the portable electronics and their components. The PSA sheet disclosed herein can be processed with excellent precision based on the support substrate; and therefore, it may accommodate processing such as punching with great precision. With the support substrate having a limited thickness, the PSA sheet disclosed herein is preferably used, for instance, in portable electronic devices constantly subjected to thinning and weight saving. With portable electronic devices having light sources, prevention of light leakage is necessary. With respect to one having a display screen, it is necessary to assure visibility of the display screen by preventing light reflection and so on. Thus, it is particularly meaningful to apply the art disclosed herein to prevent light leakage and assure visibility of the display screen.

DETAILED DESCRIPTION OF THE INVENTION

Figure 1:
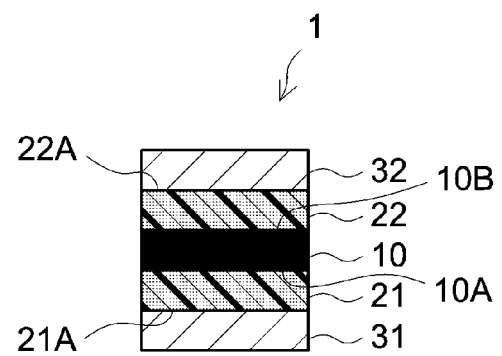
FIG. 1 shows a cross-sectional diagram schematically illustrating a constitutional example of the PSA sheet.

Preferable embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet to be provided as an actual product by the present invention.

As used herein, the term "PSA" refers to, as described earlier, a material that exists as a soft solid (a viscoelastic material) in a room temperature range and has a property to adhere easily to an adherend with some pressure applied. As defined in "Adhesion Fundamental and Practice" by C. A. Dahlquist (McLaren & Sons (1966), P. 143), PSA referred to herein may generally be a material that has a property satisfying complex tensile modulus $E^*$ (1 Hz)$<10^7$ dyne/cm$^2$ (typically, a material that exhibits the described characteristics at 25° C.).

The PSA sheet disclosed herein is a substrate-supported PSA sheet having a PSA layer on at least one face of a support substrate (substrate film) The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.

<Constitution of PSA Sheet>

For instance, the PSA sheet disclosed herein may have a cross-sectional structure as schematically illustrated in FIG. 1. PSA sheet 1 shown in FIG. 1 has a support substrate 10 as well as first and second PSA layers 21 and 22 supported on first and second faces 10A and 10B of support substrate 10, respectively. Both first and second faces 10A and 10B have non-releasable surfaces (non-release faces). For use of PSA sheet 1, the surfaces (first and second adhesive faces) 21A and 22A of first and second PSA layers 21 and 22 are applied to adherends, respectively. In other words, PSA sheet 1 is formed as a double-faced PSA sheet (an adhesively double-faced PSA sheet). PSA sheet 1 prior to use is in an embodiment where first and second adhesive faces 21A and 22A are protected with release liners 31 and 32 having releasable surfaces (release faces) at least on their PSA-facing sides. In an alternative embodiment, release liner 32 is omitted; and using a release liner 31 having a release face on each side, PSA sheet 1 can be wound to protect the second adhesive face 22A with the backside of release liner 31 brought in contact therewith.

In this constitutional example, each of the first and second PSA layers 21 and 22 comprises a black colorant and is capable of blocking light in the XYZ directions. As support substrate 10, a resin film comprising a black colorant is used. Various modifications can be made to these specific embodiments as long as the XYZ-directional light transmittances of the PSA sheet are at or below 0.04%. The art disclosed herein is not to be limited to these embodiments.

The art disclosed herein is preferably implemented as the aforementioned substrate-supported double-faced PSA sheet to fasten or join components. While not shown in the drawings, alternatively, the PSA sheet disclosed herein may be a substrate-supported single-faced PSA sheet having a PSA layer only on one face of a non-releasable substrate (support substrate). An example of the single-faced PSA sheet has a configuration shown in FIG. 1, but either without the first PSA layer 21 or without the second PSA layer 22.

<XYZ-Directional Light Transmittances of PSA Sheet>

The PSA sheet disclosed herein is characterized by having light transmittances of 0.04% or less both in an XY direction and in the Z direction. By this, the PSA sheet can provide excellent light-blocking properties in in-plane directions (directions included in the plane of the sheet) and the thickness directions. The XY-directional light transmittance of the PSA sheet is preferably 0.03% or lower, or more preferably 0.02% or lower, or yet more preferably 0.01% or lower. The Z-directional light transmittance of the PSA sheet is preferably 0.03% or lower, more preferably 0.02% or lower, or yet more preferably 0.01% or lower. The XY-directional and Z-directional light transmittances of the PSA sheet can be determined by the method described later in Examples.

It is noted that the XY-plane of the PSA sheet refers to the plane of the PSA sheet. The X direction of the PSA sheet refers to a direction along the plane of the PSA sheet or a direction included in the plane of the PSA sheet. The Y direction of the PSA sheet is the direction along the plane of the PSA sheet that orthogonally intersects the X direction or the direction included in the plane of the PSA sheet that orthogonally intersects the X direction. Accordingly, an XY direction of the PSA sheet has the same meaning as an in-plane direction of the PSA sheet. The Z direction of the PSA sheet refers to the thickness direction (running through the thickness) or can be described as the direction that runs orthogonally to the plane of the PSA sheet. As used herein, the XYZ directions (XY and Z directions) of the PSA sheet include an in-XY-plane (in-plane) direction and the Z direction (thickness direction). The same applies to the X, Y, Z, XY and XYZ directions of the support substrate and PSA layer.

<Support Substrate>

The PSA sheet disclosed herein comprises a support substrate. This allows precise processing of the PSA sheet by punching, etc. Such a PSA sheet is preferable for an application in which it is processed to have a specific shape or a small width when used. The support substrate disclosed herein has a thickness less than 75 μm. The support substrate with a limited thickness is preferably used in an application for which thinning and weight reduction are desired. While limiting the thickness of the support substrate, for instance, the PSA layer's thickness can be increased in relative to obtain greater adhesive properties including peel strength and impact resistance. From such a standpoint, the support substrate has a thickness of preferably about 60 μm or less, more preferably about 50 μm or less (e.g. less than 50 μm), yet more preferably about 40 μm or less, or particularly preferably about 30 μm or less (e.g. less than 30 μm, typically about 25 μm or less). In an embodiment, it may have a thickness of about 20 μm or less, about 12 μm or less, or even about 7 μm or less (e.g. about 3 μm or less). The minimum thickness of the support substrate is not particularly limited. From the standpoints of the handling properties and ease of processing of the PSA sheet, the support substrate usually has a thickness of 0.5 μm or greater (e.g. 1 μm or greater). In an embodiment, it may have a thickness of about 3 μm or greater. In another embodiment, it may have a thickness of about 8 μm or greater, about 13 μm or greater, or even about 16 μm or greater.

The Z-directional light transmittance of the support substrate is suitably selected so that the PSA sheet has XYZ-directional light transmittances of prescribed values or lower; and therefore, it is not particularly limited to a specific range. From the standpoint of increasing the light-blocking properties in the thickness direction of the PSA sheet, the Z-directional light transmittance of the support substrate is suitably about 10% or lower, preferably 5.0% or lower, for instance, 3.0% or lower, or even 2.0% or lower (e.g. 1.0% or lower). When the Z-directional light transmittance of the PSA sheet is achieved by the light-blocking properties of the support substrate, the Z-directional light transmittance of the support substrate is more preferably 0.3% or lower, yet more preferably 0.1% or lower, or particularly preferably 0.04% or lower (e.g. 0.03% or lower, typically 0.01% or lower).

From the standpoint of the light-blocking properties, the lower the Z-directional light transmittance of the support substrate is, the better the properties turn out to be. Thus, the lower limit is around the detection limit. On the other hand, the art disclosed herein can be about bringing about the XYZ-directional light transmittances of prescribed values or lower for the PSA sheet through the support substrate and PSA layer. Thus, it is not always necessary to excessively reduce the Z-directional light transmittance of the support substrate in relation to the Z-directional light transmittance of the PSA layer. In such a case, in view of maintaining the properties (ease of processing, mechanical properties) of the support substrate as well as in industrial viewpoints including the productivity and efficiency, it is meaningful that the support substrate has a Z-directional light transmittance of a prescribed value or higher. From such a standpoint, in a preferable embodiment, the Z-directional light transmittance of the support substrate is above 0.01% (e.g. above 0.05%), even above 0.1%, more preferably about 1% or higher, for instance, possibly about 1.5% or higher, or even about 2% or higher.

Similar to the Z-directional light transmittance, the XY-directional light transmittance of the support substrate is also suitably selected so that the PSA sheet has XYZ-directional light transmittances of prescribed values or lower; and therefore, it is not particularly limited to a specific range. From the standpoint of increasing the in-plane light-blocking properties of the PSA sheet, the XY-directional light transmittance of the support substrate is suitably about 0.04% or lower, preferably 0.03% or lower, more preferably 0.02% or lower, or yet more preferably 0.01% or lower. Such an XY-directional light transmittance can be preferably obtained by using a support substrate that includes a black colorant (favorably a resin film in which a blacked colorant is compounded).

The XY-directional light transmittance of the support substrate can be determined by the same method as the method for determining the XY-directional light transmittance of a PSA sheet described later in Examples. The Z-directional light transmittance of the support substrate is determined by the method described later in Examples.

The structure and material of the support substrate disclosed herein are not particularly limited as long as it satisfies the XYZ-directional light transmittances of the PSA sheet. The support substrate is typically a film-like substrate (or a "substrate film") A preferable substrate film comprises a resin film as the base film. The base film is typically a component capable of maintaining the shape by itself (a self-standing member). The substrate film in the art disclosed herein may be essentially formed of such a base film. Alternatively, the substrate film may include a supplemental layer in addition to the base film. Examples of the supplemental layer include a colored layer, a reflective layer, a primer layer and an anti-static layer formed on the surface of the base film.

The resin film comprises a resin material as the primary component (a component accounting for more than 50% by weight of the resin film) Examples of the resin film include polyolefinic resin films such as polyethylene (PE), polypropylene (PP), and ethylene-propylene copolymer; polyester-based resin films such as polyethylene terephthalate (PET), polybutylene terephthalate (PBT), and polyethylene naphthalate (PEN); polyurethane-based resin films; vinyl chloride-based resin film; vinyl acetate-based resin film; polyimide-based resin film; polyamide-based resin film; fluororesin films; and cellophane. The resin film can also be a rubber-based film such as natural rubber film and butyl rubber film. In particular, from the standpoint of the handling properties and the ease of processing, polyester films are preferable and among them PET film is particularly preferable. As used herein, the "resin film" typically refers to a non-porous sheet and should be conceptually distinguished from so-called non-woven and woven fabrics (i.e. the concept excludes non-woven and woven fabrics).

The substrate film (typically a resin film) can include a colorant. This allows adjustment of the light transmission (light-blocking properties) of the substrate film. For instance, the light transmission in the XYZ directions of the substrate film or even of the PSA sheet can be adjusted. As the colorant, various pigments and dyes can be used. The colorant preferably has a color (i.e. not colorless). The colorant may have a color of, for instance, black, gray, red, blue, yellow, green, yellow-green, orange, purple, gold, silver and pearl. The colored colorant tends to have excellent light-blocking properties and also tends to have excellent visibility (including machine-legibility) and workability in design. From the standpoint of obtaining excellent light-blocking properties, a black colorant is preferably used. The colorant may include a colorless colorant in combination with a colored colorant. The substrate film according to a typical embodiment disclosed herein may be essentially free of a colorless colorant. As used herein, the term "color(ed)" includes black and metallic colors. The term "colorless" is inclusive of white.

In a typical embodiment, the substrate film includes a black colorant. More specifically, a black colorant is compounded in the substrate film (typically a resin film) Here, the substrate film in which a black colorant is compounded refers to a substrate film such that a black colorant is mixed in the primary material (the material accounting the highest content of the substrate film, typically a resin material) forming the substrate film. The black colorant is substantially dispersed in the substrate film. There are no particular limitations to the state of dispersion of the black colorant in the substrate film. The black colorant is preferably dispersed in the substrate film to a degree where the substrate film's light transmission in the Z direction is at or below a certain value (e.g. at or below 5%). The use of the black colorant-containing substrate film can preferably bring about excellent light-blocking properties in the XYZ directions of the PSA sheet. The black colorant-containing substrate film has advantage in terms of precision of processing because the substrate film (typically a resin film) has superior rigidity with the relatively large thickness as compared to a substrate film that has a laminate structure formed of a resin film and a conventional colored layer (printed layer) that has a comparable thickness to the substrate film. As a colored layer is no longer necessary, the PSA layer can be made thicker by that much, making it more likely to maintain good adhesive properties. It is noted that, in other words, the black colorant-containing substrate film itself is colored black and can be referred to as a black substrate film.

As the black colorant in the substrate film, organic and inorganic colorants (pigments, dyes, etc.) can be used. Specific examples of the black colorant include carbon blacks (furnace black, channel black, acetylene black, thermal black, lamp black, turpentine soot, etc.), graphite, copper oxide, manganese(IV) oxide, aniline black, perylene black, titanium black, cyanine black, activated carbon, ferrites (non-magnetic ferrite, magnetic ferrite, etc.), magnetite, chromium oxide, iron oxide, molybdenum disulfide, chromium complexes, and anthraquinone-based colorants. Among them, carbon black is preferable.

The black colorant is not particularly limited. A particulate colorant (pigment) can be preferably used because it allows efficient adjustment of light-blocking properties in a small amount. In a preferable embodiment, a black colorant (e.g. a black pigment such as carbon black) having a mean particle diameter of 10 nm or greater (e.g. about 50 nm or greater) can be used. The maximum mean particle diameter of the black colorant is not particularly limited. It can be usually about 500 nm or less, preferably about 300 nm or less, or more preferably about 250 nm or less, for instance, 200 nm or less (e.g. about 120 nm or less). As used herein, unless otherwise specified, the term "mean particle diameter" refers to the 50th-percentile particle diameter (the median volume diameter; it may be abbreviated as $D_{50}$ hereinafter) in its size distribution obtained by a particle size meter based on laser scattering/diffraction.

The amount of colorant in the substrate film is not particularly limited. It can be used in an amount suitably adjusted to provide desirable optical properties. The amount of black colorant is usually suitably about 0.1% to 30% of the total weight of the substrate film. For instance, it can be 0.1% to 25% (typically 0.1% to 20%) by weight.

The substrate film disclosed herein may include other colorant(s) (pigments and dyes) that are not black-colored. One example of such a non-black colorant is white colorant. Examples of the white colorant include inorganic white colorants such as titanium oxides (e.g., titanium dioxides such as rutile titanium dioxide, anatase titanium dioxide, etc.), zinc oxide, aluminum oxide, silicon oxide, zirconium oxide, magnesium oxide, calcium oxide, tin oxide, barium oxide, cesium oxide, yttrium oxide, magnesium carbonate, calcium carbonates (light calcium carbonate, heavy calcium carbonate, etc.), barium carbonate, zinc carbonate, aluminum hydroxide, calcium hydroxide, magnesium hydroxide, zinc hydroxide, aluminum silicate, magnesium silicate, calcium silicate, barium sulfate, calcium sulfate, barium stearate, zinc oxide, zinc sulfide, talc, silica, alumina, clay, kaolin, titanium phosphate, mica, gypsum, white carbon, diatomaceous earth, bentonite, lithopone, zeolite, sericite, hydrated halloysite, etc.; organic white colorants such as acrylic resin particles, polystyrene-based resin particles, polyurethane-based resin particles, amide-based resin particles, polycarbonate-based resin particles, silicone-based resin particles, urea-formaldehyde-based resin particles, melamine resin particles, etc.; and the like. The amount of white colorant is not particularly limited, and they can be used in an amount suitable for producing desirable optical properties.

The amount of non-black colorant used in the substrate film is not particularly limited. It can be used in an amount suitably adjusted to provide desirable optical properties. The amount of non-black colorant is usually suitably about 0.1% to 30% of the weight of the substrate film. For instance, it can be 0.1% to 25% (typically 0.1% to 20%) by weight.

To the substrate film, various additives can be added as necessary, such as fillers (inorganic and organic fillers, etc.), dispersing agent (surfactant, etc.), anti-aging agent, antioxidant, UV absorber, anti-static agent, slip agent and plasticizer. These various additives is usually added in an amount equivalent to less than 30% by weight (e.g. less than 20% by weight, typically less than 10% by weight).

The substrate film may have a monolayer structure or a multilayer structure with two, three or more layers. From the standpoint of the shape stability, the substrate film preferably has a monolayer structure. In case of a multilayer structure, at least one layer (preferably each layer) preferably has a continuous structure formed of the resin (e.g. a polyester-based resin, typically a black colorant-containing resin). The method for producing the substrate film (typically a resin film) is not particularly limited and a heretofore known method can be suitably employed. For instance, heretofore known general film-forming methods can be suitably employed, such as extrusion, inflation molding, T-die casting, and calender rolling.

The substrate film can be colored with a colored layer placed on the surface of the base film (preferably a resin film) In the substrate film in such an embodiment including the base film and colored layer, the base film may or may not include a colorant. The colored layer can be placed on one or each face of the base film. In an embodiment having a colored layer on each face of the base film, the respective colored layers may be the same or different in constitution.

Such a colored layer can be typically formed by applying a colored layer-forming composition to a base film, the composition comprising a colorant and a binder. As the colorant, heretofore known pigments and dyes can be used, similar to the colorants that can be included in the PSA layer and substrate film. As the binder, materials known in the paint or printing field can be used without particular limitations. Examples include polyurethane, phenol resin, epoxy resin, urea-melamine resin and polymethyl methacylate. The colored layer-forming composition can be, for instance, a solvent-based type, UV-curable type, heat-curable type, etc. The colored layer can be formed by a conventional colored layer-forming method without particular limitations. For instance, it is preferable to use a method where the colored layer (printed layer) is formed by gravure printing, flexographic printing, offset printing, etc.

The colored layer may have a monolayer structure formed entirely of a single layer or a multilayer structure including two, three or more colored sublayers. For instance, a colored layer having a multilayer structure with two or more colored sublayers can be formed by repeated applications (e.g. printing) of a colored layer-forming composition. The respective colored sublayers may be the same or different in color and amount of colorant. In a colored layer to provide light-blocking properties, from the standpoint of preventing formation of pinholes to increase the reliability of light leakage prevention, a multilayer structure is particularly significant.

The colored layer has a total thickness of usually suitably about 1 µm to 10 µm, preferably about 1 µm to 7 µm, or possibly, for instance, about 1 µm to 5 µm. In the colored layer including two or more colored sublayers, it is usually preferable that each sublayer has a thickness of about 1 µm to 2 µm.

The surface of the substrate film may be subjected to heretofore known surface treatments such as corona discharge treatment, plasma treatment, UV irradiation, acid treatment, base treatment, and primer coating. Such a surface treatment may increase the tightness of adhesion between the substrate film and the PSA layer. In other words, it may improve the anchoring of the PSA layer to the substrate film. The art disclosed herein is made as a substrate-supported adhesively single-faced PSA sheet, the backside of the substrate film may be subjected to a release treatment as necessary. In the release treatment, for instance, a general silicone-based, long-chain alkyl-based or fluorine-based release agent is applied typically in a thin layer measuring about 0.01 µm to 1 µm (e.g. 0.01 µm to 0.1 µm). Such a release treatment can be provided to bring about easier unwinding of a roll formed by winding the PSA sheet and other effects.

<PSA Layer>

The PSA layer disclosed herein is not particularly limited as long as the PSA sheet has XYZ-directional light transmittances of prescribed values or lower. A suitable kind can be selected among various PSA layers in accordance with desired adhesive properties, etc. The light transmittances of the PSA layer are also selected so that the PSA sheet has XYZ-directional light transmittances of prescribed values or below; and therefore, they are not particularly limited to specific ranges. From the standpoint of increasing the light-blocking properties in the thickness direction of the PSA sheet, the Z-directional light transmittance of the PSA layer is suitably about 10% or lower, preferably 4.0% or lower, for instance, 2.0% or lower. When the Z-directional light transmittance of the PSA sheet is achieved by the light-blocking properties of the PSA layer, the Z-directional light transmittance of the PSA layer is more preferably 0.5% or lower, yet more preferably 0.1% or lower, or particularly preferably 0.04% or lower (e.g. 0.03% or lower, typically 0.01% or lower).

From the standpoint of the light-blocking properties, the lower the Z-directional light transmittance of the PSA layer is, the better the properties turn out to be. Thus, the lower limit is around the detection limit. On the other hand, the art disclosed herein can be about bringing about the XYZ-directional light transmittances of prescribed values or lower for the PSA sheet through the support substrate and PSA layer. Thus, it is not always necessary to excessively reduce the Z-directional light transmittance of the PSA layer in relation to the Z-directional light transmittance of the support substrate. In such a case, in view of maintaining the adhesive properties and in industrial viewpoints including the productivity and efficiency, it is meaningful that the PSA layer has a Z-directional light transmittance of a prescribed value or higher. From such a standpoint, in a preferable embodiment, the Z-directional light transmittance of the PSA layer is above 0.01%, more preferably above 0.1%, yet more preferably about 1% or higher, for instance, possibly about 2% or higher, or even about 2.5% or higher.

Similar to the Z-directional light transmittance, the XY-directional light transmittance of the PSA layer is also suitably selected so that the PSA sheet has XYZ-directional light transmittances of prescribed values or lower; and therefore, it is not particularly limited to a specific range. From the standpoint of increasing the in-plane light-blocking properties of the PSA sheet, the XY-directional light transmittance of the PSA layer is suitably about 0.04% or lower, preferably 0.03% or lower, more preferably 0.02% or lower, or yet more preferably 0.01% or lower. Such an XY-directional light transmittance can be preferably obtained by adding a black colorant to the PSA layer.

The XY-directional light transmittance of the PSA layer can be determined by the same method as the method for determining the XY-directional light transmittance of a PSA sheet described later in Examples. The Z-directional light transmittance of the PSA layer is determined by the method described later in Examples.

(Base Polymer)

In the art disclosed herein, the type of the PSA constituting the PSA layer is not particularly limited. The PSA layer may comprise, as its base polymer, one, two or more species among various rubber-like polymers such as acrylic polymer, rubber-based polymer, polyester-based polymer, urethane-based polymer, polyether-based polymer, silicone-based polymer, polyamide-based polymer, and fluoropolymer. From the standpoint of the adhesive properties, cost, etc., a preferable PSA comprises an acrylic polymer or a rubber-based polymer as the base polymer. In particular, an acrylic PSA (a PSA whose base polymer is an acrylic polymer) is preferable. In the following, a PSA sheet having an acrylic PSA layer (i.e. a PSA layer formed of an acrylic PSA) is mainly described; however, the PSA layer in the PSA sheet disclosed herein is not to be limited to those formed of acrylic PSA.

The "base polymer" of a PSA refers to a rubber-like polymer in the PSA. The rubber-like polymer refers to a polymer that shows rubber elasticity around room temperature. As used herein, the "main component" (primary component) refers to a component accounting for more than 50% by weight.

The "acrylic polymer" refers to a polymer that includes a monomeric unit derived from a monomer having at least one (meth)acryloyl group per molecule. Hereinafter, a monomer having at least one (meth)acryloyl group per molecule is referred to as an "acrylic monomer." Thus, as used herein, the acrylic polymer is defined to be a polymer that includes a monomeric unit derived from an acrylic monomer. Typical examples of the acrylic polymer include an acrylic polymer in which the acrylic monomer accounts for more than 50% by weight of all monomers used in synthesizing the acrylic polymer.

As used herein, the term "(meth)acryloyl" is meant to be inclusive of acryloyl and methacryloyl. Likewise, "(meth)acrylate" means acrylate and methacrylate, and "(meth)acryl" is meant to be inclusive of acryl and methacryl respectively.

A preferable example of the acrylic polymer is a polymer formed from a starting monomer mixture that comprises an alkyl (meth)acrylate as the primary monomer. Here, the primary monomer refers to a component that accounts for more than 50% by weight of the monomer composition of the starting monomer mixture.

For example, a compound represented by the following formula (1) can be advantageously used as the alkyl (meth)acrylate.

$$CH_2=C(R^1)COOR^2 \quad (1)$$

Here, $R^1$ in the formula (1) is a hydrogen atom or a methyl group. $R^2$ is an acyclic alkyl group having 1 to 20 carbon atoms (hereinafter such a range of the number of carbon atoms may be expressed as "$C_{1-20}$"). From the standpoint of the storage elastic modulus of the PSA and the like, the primary monomer is suitably an alkyl (meth)acrylate in which $R^2$ is a acyclic $C_{1-14}$ (e.g. $C_{2-10}$, typically $C_{4-8}$) alkyl group. From the standpoint of the adhesive properties, the primary monomer is preferably an alkyl acrylate in which $R^1$ is a hydrogen atom and $R^2$ is an acyclic $C_{4-8}$ alkyl group (which may also be simply referred to as a $C_{4-8}$ alkyl acrylate).

Examples of the alkyl (meth)acrylate having a $C_{1-20}$ acyclic alkyl group for $R^2$ include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. These alkyl (meth)acrylates can be used singly as one species or in a combination of two or more species. Preferable alkyl (meth)acrylates include n-butyl acrylate (BA) and 2-ethylhexyl acrylate (2EHA).

Typically, the amount of the alkyl (meth)acrylate among the monomeric components constituting the acrylic polymer is more than 50% by weight, for example 70% by weight or more, may be 85% by weight or more, or may be even 90% by weight or more. The amount of the alkyl (meth)acrylate among the monomeric components is typically less than 100% by weight. From the standpoint of the cohesive strength, etc., a suitable amount is normally 99.5% by weight or less, and this amount may be 98% by weight or less (for example, less than 97% by weight).

The art disclosed herein can be preferably implemented in an embodiment in which the starting monomer mixture includes at least 50% $C_{1-4}$ alkyl (meth)acrylate by weight. The ratio of $C_{1-4}$ alkyl (meth)acrylate in the monomers may be 70% by weight or higher, or may be 85% by weight or higher (e.g. 90% by weight or higher). On the other hand, from the standpoint of the cohesive strength, etc., the ratio of $C_{1-4}$ alkyl (meth)acrylate in the starting monomers is usually suitably 99.5% by weight or lower, and this amount may be 98% by weight or lower (for example, 97% by weight or lower).

The art disclosed herein can be preferably implemented in an embodiment in which the $C_{2-4}$ alkyl acrylate accounts for 50% by weight or more (e.g. 70% by weight or more, 85% by weight or more, or 90% by weight or more) of the monomers. Specific examples of the $C_{2-4}$ alkyl acrylate include ethyl acrylate, propyl acrylate, isopropyl acrylate, n-butyl acrylate (BA), isobutyl acrylate, s-butyl acrylate, and t-butyl acrylate. The $C_{2-4}$ alkyl acrylates can be used singly as one species or in a combination of two or more species. According to such an embodiment, the resulting PSA sheet is likely to show tight adhesion to an adherend. In a preferable embodiment, BA accounts for more than 50% by weight (e.g. 70% by weight or more, or 85% by weight or more, or 90% by weight or more) of the monomers. When the $C_{2-4}$ alkyl acrylate (e.g. BA) is used at least in a prescribed amount, even if a black colorant (e.g. carbon black) is added to the PSA, the colorant can be well dispersed in the layer while maintaining good levels of adhesive properties such as adhesive strength. From the standpoint of obtaining satisfactory cohesive strength, etc., the ratio of $C_{1-4}$ alkyl (meth)acrylate in the monomers is usually suitably 99.5% by weight or lower, or possibly 98% by weight or lower (e.g. below 97% by weight).

In another embodiment, the starting monomer mixture may include at least 50% (e.g. at least 70%, at least 85% or at least 90%) $C_{5-20}$ alkyl (meth)acrylate by weight. A preferable $C_{5-20}$ alkyl (meth)acrylate is a $C_{3-14}$ alkyl (meth)acrylate. In an embodiment, a $C_{6-10}$ alkyl acrylate (e.g. a $C_{8-10}$ alkyl acrylate) can be preferably used.

In a preferable embodiment of the art disclosed herein, the monomers forming the base polymer (e.g. the acrylic polymer) may include a carboxy group-containing monomer. By including the carboxy group-containing monomer in the monomers, it becomes easy to obtain a PSA sheet exhibiting satisfactory shear impact resistance. In addition, it can be advantageous for improving the adhesion between the PSA layer and the adherend. Examples of the carboxy group-containing monomer include ethylenically unsaturated monocarboxylic acids such as acrylic acid, methacrylic acid, carboxyethyl (meth)acrylate, carboxypentyl (meth)acrylate, crotonic acid, and isocrotonic acid; and ethylenically unsaturated dicarboxylic acids such as maleic acid, itaconic acid, citraconic acid and anhydrides thereof (maleic anhydride, itaconic anhydride, and the like). These acids and anhydrides can be used singly as one species or in a combination of two species. Among them, acrylic acid (AA) and methacrylic acid (MAA) exemplify preferable carboxy group-containing monomers. AA is particularly preferable.

In an embodiment in which a carboxy group-containing monomer is copolymerized in the base polymer, the ratio of carboxy group-containing monomer in the monomers forming the base polymer is not particularly limited and it can be, for example, 0.2% by weight or more (typically 0.5% by weight or more) of the monomers. It is usually suitably 1% by weight or more or can be 2% by weight or more, or even 3% by weight or more. With more than 3% carboxy group-containing monomer by weight, a greater effect can be obtained and the resulting PSA sheet may have greater holding properties. From such a standpoint, in a preferable embodiment, the carboxy group-containing monomer content may be 3.2% by weight or more, and also may be 3.5% by weight or more, 4% by weight or more, and 4.5% by weight or more of the monomers. When the carboxy group-containing monomer is copolymerized in such an amount, for instance, even if a black colorant (e.g. carbon black) is added to the PSA, the colorant can be well dispersed in the layer while preferably obtaining adhesive properties such as shear cohesive strength.

The maximum amount of carboxy group-containing monomer is not particularly limited. For instance, it can be 15% by weight or less, 12% by weight or less, or even 10% by weight or less. When the carboxy group-containing monomer is copolymerized at or below a prescribed ratio, even if a black colorant (e.g. carbon black) is added to the PSA, the colorant can be well dispersed in the layer while maintaining good levels of adhesive properties such as adhesive strength. The art disclosed herein can be preferably implemented in an embodiment in which the carboxy group-containing monomer content is 7% by weight or less (typically less than 7% by weight, e.g. 6.8% by weight or less, or 6.0% by weight or less).

The secondary monomer copolymerizable with the alkyl (meth)acrylate as the primary monomer can be useful for introducing a crosslinking point into the acrylic polymer or for increasing the cohesiveness of the acrylic polymer. The secondary monomer can also be useful for adjusting the relative dielectric constant of the PSA layer. For example, the following functional group-containing monomers (excluding the carboxy group-containing monomers) can be used singly as one species or in a combination of two or more species as the secondary monomer.

Hydroxyl group-containing monomers: for example, hydroxyalkyl (meth)acrylates such as 2-hydroxyethyl (meth)acrylate, 2-hydroxypropyl (meth)acrylate, 3-hydroxypropyl (meth)acrylate, and 4-hydroxybutyl (meth)acrylate; unsaturated alcohols such as vinyl alcohol and allyl alcohol; and polypropylene glycol mono (meth)acrylate.

Amide group-containing monomers: for example, (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide, and N-butoxymethyl (meth)acrylamide.

Amino group-containing monomers: for example, aminoethyl (meth)acrylate, N,N-dimethylaminoethyl (meth)acrylate, and t-butylaminoethyl (meth)acrylate.

Monomers having an epoxy group: for example, glycidyl (meth)acrylate, methylglycidyl (meth)acrylate, and allyl glycidyl ether.

Cyano group-containing monomers: for example, acrylonitrile and methacrylonitrile.

Keto group-containing monomers: for example, diacetone (meth)acrylamide, diacetone (meth)acrylate, vinyl methyl ketone, vinyl ethyl ketone, allyl acetoacetate, and vinyl acetoacetate.

Monomers having a nitrogen atom-containing ring: for example, N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine.

Alkoxysilyl group-containing monomers: for example, 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane.

When the monomers forming the acrylic polymer include a functional group-containing monomer such as described above, the amount of the functional group-containing monomer among the monomeric components is not particularly limited. From the standpoint of suitably exhibiting the effect of using the functional group-containing monomer, the amount of the functional group-containing monomer among the monomeric components can be, for example, 0.1% by weight or more, a suitable amount is usually 0.5% by weight or more, and this amount may be 1% by weight or more. From the standpoint of facilitating the balance of adhesive performance in relation to the primary monomer or the carboxy group-containing monomer, a suitable amount of the functional group-containing monomer among the monomeric components is usually 40% by weight or less, and this amount is preferably 20% by weight or less, or may be 10% by weight or less (e.g. 5% by weight or less). The art disclosed herein can be preferably implemented in an embodiment in which the monomeric components include substantially no functional group-containing monomer (e.g. an embodiment in which the monomeric components include essentially the alkyl (meth)acrylate and the carboxy group-containing monomer). Here, the expression that the monomeric components include substantially no functional group-containing monomer means that a functional group-containing monomer is not used at least intentionally. For example, it may be permitted that about 0.05% by weight or less (typically 0.01% by weight or less) of a functional group-containing monomer is included unintentionally. In an acrylic polymer having such a monomer composition, black colorant (e.g. carbon black) may readily disperse.

The monomers forming the acrylic polymer may include other comonomer besides the secondary monomer for the purpose of improving the cohesiveness or the like. Examples of the other comonomer include vinyl ester monomers such as vinyl acetate, vinyl propionate, and vinyl laurate; aromatic vinyl compounds such as styrene, substituted styrene (α-methylstyrene and the like), and vinyl toluene; cycloalkyl (meth)acrylates such as cyclohexyl (meth)acrylate, cyclopentyl (meth)acrylate, and isobornyl (meth)acrylate; aromatic ring-containing (meth)acrylates such as aryl (meth)acrylates (e.g. phenyl (meth)acrylate), aryloxyalkyl (meth)acrylates (e.g. phenoxyethyl (meth)acrylate), and arylalkyl (meth)acrylates (e.g. benzyl (meth)acrylate); olefinic monomers such as ethylene, propylene, isoprene, butadiene, and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether monomers such as methyl vinyl ether and ethyl vinyl ether; and polyfunctional monomers having two or more (e.g. three or more) polymerizable functional groups (e.g. (meth)acryloyl groups) in a molecule, such as 1,6-hexanediol di(meth)acrylate and trimethylolpropane tri(meth)acrylate.

The amount of such other comonomer is not particularly limited and may be suitably selected according to the purpose and application. From the standpoint of suitably obtaining the effect of the use thereof, a suitable amount is usually 0.05% by weight or more, and this amount may be 0.5% by weight or more. From the standpoint of facilitating the balance of the PSA performance, a suitable amount of the other copolymerizable component among the monomeric components is usually 20% by weight or less, and this amount may be 10% by weight or less (e.g. 5% by weight or less). The art disclosed herein also can be preferably implemented in an embodiment in which the monomeric components include substantially no other copolymerizable components. Here, the expression that the monomeric components include substantially no other copolymerizable monomers means that no other copolymerizable monomers is used at least intentionally. For example, it may be permitted that about 0.01% by weight or less of other copolymerizable monomers is included unintentionally. In an acrylic polymer having such a monomer composition, black colorant (e.g. carbon black) may readily disperse.

The copolymer composition of the acrylic polymer can be suitably designed so that the polymer has a glass transition temperature (Tg) of about −15° C. or below (e.g. about −70° C. or above and −15° C. or below). Here, the acrylic polymer's Tg refers to the Tg value determined by the Fox equation based on the composition of the monomers used in the synthesis of the polymer. As shown below, the Fox equation is a relational expression of the Tg of a copolymer and the glass transition temperatures Tgi of the homopolymers obtained by homopolymerization of the monomers constituting the copolymer.

$$1/Tg = \Sigma(Wi/Tgi)$$

In the Fox equation above, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i.

As for the glass transition temperatures of homopolymers used in Tg determination, values disclosed in publicly known resources are used. For instance, with respect to the monomers listed below, as the glass transition temperatures of their corresponding homopolymers, the following values are used.

| | |
|---|---|
| 2-ethylhexyl acrylate | −70° C. |
| isononyl acrylate | −60° C. |
| n-butyl acrylate | −55° C. |
| ethyl acrylate | −22° C. |
| methyl acrylate | 8° C. |
| methyl methacrylate | 105° C. |
| 2-hydroxyethyl acrylate | −15° C. |
| 4-hydroxybutyl acrylate | −40° C. |
| vinyl acetate | 32° C. |
| acrylic acid | 106° C. |
| methacrylic acid | 228° C. |

With respect to the Tg values of the homopolymers of other monomers besides those exemplified above, the values given in "Polymer Handbook" (3rd edition, John Wiley & Sons, Inc., Year 1989) are used. When the Polymer Handbook provides two or more values for a certain monomer, the highest value is used. In the case where the values are not described in the Polymer Handbook, those that can be obtained by the measuring method described in Japanese Patent Application Publication No. 2007-51271 is used.

While no particular limitations are imposed, from the standpoint of the tightness of adhesion to an adherend, the Tg of the acrylic polymer is advantageously about −25° C. or lower, preferably about −35° C. or lower, and more preferably about −40° C. or lower, but these values are not particularly limiting. In an embodiment, from the standpoint of cohesiveness, the Tg of the acrylic polymer may be, for example, about −65° C. or higher, about −60° C. or higher, or about −55° C. or higher. The art disclosed herein can be preferably implemented in an embodiment in which the Tg of the acrylic polymer is about −65° C. or higher and about −35° C. or lower (e.g. about −55° C. or higher and about −40° C. or lower). The Tg of the acrylic polymer can be adjusted by suitably changing the monomer composition (that is, the type of monomers used for synthesizing the polymer and the ratio of the amounts used).

The method for obtaining the acrylic polymer is not particularly limited. Various polymerization methods known as synthetic means for acrylic polymers can be suitably employed, with the methods including solution polymerization method, emulsion polymerization, bulk polymerization, suspension polymerization, and photopolymerization. For example, a solution polymerization method can be preferably used. The polymerization temperature in the solution polymerization can be suitably selected according to the types of monomer and solvent to be used, the type of polymerization initiator, and the like. It can be, for example, about 20° C. to 170° C. (typically, about 40° C. to 140° C.).

As for the solvent (polymerization solvent) used in solution polymerization, a suitable species can be selected among heretofore known organic solvents. For instance, one species of solvent or a mixture of two or more species of solvent can be used, selected among aromatic compounds (typically aromatic hydrocarbons) such as toluene; acetic acid esters such as ethyl acetate; aliphatic or alicyclic hydrocarbons such as hexane and cyclohexane; halogenated alkanes such as 1,2-dichloroethane; lower alcohols (e.g. monohydric alcohols with one to four carbon atoms) such as isopropanol; ethers such as tert-butyl methyl ether; and ketones such as methyl ethyl ketone.

The initiator used for polymerization can be suitably selected among heretofore known polymerization initiators according to the type of polymerization method. For example, one or two or more species of azo polymerization initiators such as 2,2'-azobisisobutyronitrile (AIBN) can be preferably used. Other examples of the polymerization initiator include persulfates such as potassium persulfate; peroxide initiators such as benzoyl peroxide and hydrogen peroxide; substituted ethane initiators such as phenyl-substituted ethane; and aromatic carbonyl compounds. Still other examples of the polymerization initiator include redox type initiators based on a combination of a peroxide and a reducing agent. Such polymerization initiators can be used singly as one species or in a combination of two or more species. The polymerization initiator can be used in a typical amount, for example, about 0.005 part to 1 part by weight (typically, about 0.01 part to 1 part by weight) to 100 parts by weight of the monomers.

The solution polymerization yields a polymerization reaction mixture as a solution of acrylic polymer in an organic solvent. The PSA layer in the art disclosed herein may be formed from a PSA composition comprising the polymerization reaction mixture or an acrylic polymer solution obtained by subjecting the reaction mixture to a suitable work-up. For the acrylic polymer solution, the polymerization reaction mixture can be used after adjusted to suitable viscosity and/or concentration as necessary. Alternatively, an acrylic polymer can be synthesized by a polymerization method other than solution polymerization, such as emulsion polymerization, photopolymerization, bulk polymerization, etc., and an acrylic polymer solution prepared by dissolving the acrylic polymer in an organic solvent can be used as well.

The weight average molecular weight (Mw) of the base polymer (preferably acrylic polymer) in the art disclosed herein is not particularly limited, and may be, for example, in the range of about $10 \times 10^4$ to $500 \times 10^4$. From the standpoint of the adhesive properties, the Mw of the base polymer is in the range of about $30 \times 10^4$ to $200 \times 10^4$ (more preferably, about $45 \times 10^4$ to $150 \times 10^4$, typically about $65 \times 10^4$ to $130 \times 10^4$). Here, Mw refers to a value obtained based on polystyrene standards by gel permeation chromatography (GPC). As the GPC apparatus, for example, model name "HLC-8320 GPC" (column: TSK gel GMH·H (S), available from Tosoh Corporation) can be used.

(Colorant)

The PSA layer can include a colorant. By this, the light transmission (light-blocking properties) of the PSA layer can be adjusted. Adjusting the light transmission of the PSA layer can also be useful for adjusting the light transmission of a PSA sheet that includes the PSA layer. As the colorant, various materials can be used that can attenuate the light advancing inside the PSA layer by reflection and/or absorption. The colorant is not particularly limited in color. It can be colored or colorless. The colorant may have a color of, for instance, black, gray, white, red, blue, yellow, green, yellow-green, orange, purple, gold, silver and pearl. The PSA layer may include the colorant typically dispersed (possibly dissolved) in the components of the PSA layer.

Heretofore known pigments and dyes can be used as the colorant. The pigments can be exemplified by inorganic pigments such as zinc carbonate, zinc oxide, zinc sulfide, talc, kaolin, calcium carbonate, titanium oxide, silica, lithium fluoride, calcium fluoride, barium sulfate, alumina, zirconia, iron oxide-based, ion hydroxide-based, chromium oxide-based, spinel-based, chromic acid-based, chromium vermilion-based, iron blue-based, aluminum powder-based, bronze powder-based, and silver powder-based pigments, and calcium phosphate, and organic pigments such as phthalocyanine-based, azo-based, condensed azo-based, azo lake-based, anthraquinone-based, perylene-perinone-based, indigo-based, thioindigo-based, isoindolinone-based, azomethine-based, dioxazine-based, quinacridone-based, aniline black-based, triphenylmethane-based, and carbon black-based pigments. Examples of the dyes include azo-based dyes, anthraquinone, quinophthalone, styryl, diphenylmethane, triphenylmethane, oxazine, triazine, xanthan, methane, azomethine, acridine, and diazine. The colorants can be used singly as one species or in a suitable combination of two or more species.

A black colorant can be preferably used because it allows efficient adjustment of light-blocking properties in a small amount. Specific examples of the black colorant include carbon black (furnace black, channel black, acetylene black, thermal black, lamp black, pine smoke, and the like), graphite, copper oxide, manganese dioxide, aniline black, perylene black, titanium black, cyanine black, activated carbon, ferrites (nonmagnetic ferrites, magnetic ferrites, and the like), magnetite, chromium oxide, iron oxide, molybdenum disulfide, chromium complexes, anthraquinone-based colorant, and the like. Among them, carbon black is preferable.

A particulate colorant (pigment) can be preferably used because it allows efficient adjustment of light-blocking properties in a small amount. In a preferable embodiment, a pigment (a particulate black colorant such as carbon black) having a mean particle diameter of about 10 nm or larger can be used. The mean particle diameter can be, for instance, about 50 nm or greater, about 100 nm or greater, or even about 150 nm or greater. The maximum mean particle diameter of the colorant is not particularly limited. For instance, it can be about 500 nm or less, preferably about 300 nm or less, more preferably about 250 nm or less, or yet more preferably 200 nm or less (e.g. about 120 nm or less).

The amount of colorant can be selected so as to form a PSA sheet that satisfies desirable light transmission in the XYZ directions. To 100 parts by weight of the base polymer, it is usually suitably 0.5 part by weight or greater. From the standpoint of the light-blocking properties, it is preferably 1.0 part by weight or greater, more preferably 2.0 parts by weight or greater, or yet more preferably 3.0 parts by weight or greater (e.g. 4.0 parts by weight or greater). The amount of colorant can be, for instance, less than 15 parts by weight to 100 parts by weight of the base polymer. From the standpoint of inhibiting possible degradation of adhesive properties caused by addition of the colorant, the amount of colorant to 100 parts by weight of the base polymer is usually suitably less than 10 parts by weight, preferably less than 8 parts by weight, or more preferably less than 6 parts by weight.

The PSA composition disclosed herein may comprise a component that contributes to enhancement of the colorant dispersity. The dispersity enhancer can be, for instance, a polymer, oligomer, liquid resin or surfactant. The dispersity enhancer is preferably dissolved in the PSA composition. The oligomer can be a low molecular weight polymer formed of monomers including one, two or more species of acrylic monomer as the examples shown earlier (e.g. an acrylic oligomer having a Mw below about $10 \times 10^4$, or preferably below $5 \times 10^4$). The liquid resin can be, for instance, a tackifier resin (typically, a rosin-based, terpene-based, or hydrocarbon-based tackifier resin, or the like, e.g. hydrogenated rosin methyl ester, etc.). Such a dispersity enhancer can inhibit uneven dispersion of the colorant (e.g. particulate black colorant such as carbon black) and further inhibit uneven coloring of the PSA layer. Therefore, a PSA sheet can be formed with a good appearance.

The amount of dispersity enhancer is not particularly limited. From the standpoint of reducing its influence on the adhesive properties (e.g. lowering of the cohesion), relative to the entire PSA layer, it is usually suitably about 20% by weight or less (preferably about 10% by weight or less, more preferably 7% by weight or less, e.g. about 5% by weight or less). In an embodiment, the amount of dispersity enhancer can be up to about 10-fold (preferably up to about 5-fold, e.g. up to about 3-fold) of the colorant's weight. On the other hand, from the standpoint of favorably obtaining the effect of dispersity enhancer, its amount is usually suitably about 0.2% by weight or more (typically about 0.5% by weight or more, preferably about 1% by weight or more) of the entire PSA layer. In an embodiment, the amount of dispersity enhancer can be at least about 0.2-fold (preferably at least about 0.5-fold, e.g. at least 1-fold) of the colorant's weight.

(Tackifier Resin)

The PSA layer in the art disclosed herein may include a tackifier resin. This can increase the peel strength of the PSA sheet. As the tackifier resin, one, two or more species can be used, selected among various known tackifier resins such as a phenolic tackifier resin, a terpene tackifier resin, a modified terpene tackifier resin, a rosin tackifier resin, a hydrocarbon tackifier resin, an epoxy tackifier resin, a polyamide tackifier resin, an elastomer tackifier resin, and a ketone tackifier resin.

Examples of the phenolic tackifier resins include terpene phenolic resins, hydrogenated terpene phenolic resins, alkylphenolic resins, and rosin phenolic resins.

The term "terpene phenolic resin" refers to a resin including a terpene residue and a phenol residue, and is inclusive of both a copolymer of a terpene and a phenol compound (terpene-phenol copolymer resin) and a phenol-modified homopolymer or copolymer of a terpene (phenol-modified terpene resin). Preferable examples of terpenes constituting such terpene phenolic resins include monoterpenes such as α-pinene, β-pinene, and limonene (including d-form, l-form and d/l form (dipentene)). The hydrogenated terpene phenolic resin has a structure obtained by hydrogenating such a terpene phenolic resin. Such a resin is sometimes referred to as a hydrogen-added terpene phenolic resin.

The alkylphenolic resin is a resin (oily phenolic resin) obtainable from an alkylphenol and formaldehyde. Examples of alkylphenol resins include novolac type and resole type resins.

A rosin phenolic resin is typically a phenol-modified product of rosins or various rosin derivatives (including rosin esters, unsaturated fatty acid-modified rosins, and unsaturated fatty acid-modified rosin esters) described later. Examples of the rosin phenolic resin include rosin phenolic resins obtained, for example, by a method of adding a phenol to a rosin or the rosin derivative with an acid catalyst and thermally polymerizing.

Examples of terpene-based tackifier resins include polymers of terpenes (typically monoterpenes) such as α-pinene, β-pinene, d-limonene, l-limonene, and dipentene. The polymer may be a homopolymer of one type of terpene or a copolymer of two or more types of terpenes. The homopolymers of one type of terpene can be exemplified by an α-pinene polymer, β-pinene polymer, and a dipentene polymer. The modified terpene resin is exemplified by modifications of the terpene resin. Specific examples include styrene-modified terpene resins and hydrogenated terpene resins.

The term "rosin-based tackifier resin" as used herein is inclusive of both rosins and rosin derivative resins. Examples of rosins include unmodified rosins (raw rosins) such as gum rosin, wood rosin, and tall oil rosin, and modified rosins obtained by modification of the unmodified rosins by hydrogenation, disproportionation, polymerization, and the like (hydrogenated rosins, disproportionated rosins, polymerized rosins, and other chemically modified rosins).

The rosin derivative resin is typically a derivative of an aforementioned rosin. The term "rosin-based resin" as used herein is inclusive of derivatives of unmodified rosins and derivatives of modified rosins (including hydrogenated rosins, disproportionated rosins and polymerized rosins). Examples thereof include rosin esters such as unmodified rosin esters which are esters of unmodified rosins and alcohols, and modified rosin esters which are esters of modified rosins and alcohols; unsaturated fatty acid-modified rosins obtained by modification of rosins with unsaturated fatty acids; unsaturated fatty acid-modified rosin esters obtained by modification of rosin esters with unsaturated fatty acids; rosin alcohols obtained by reduction treatment of carboxy groups of rosins or various abovementioned rosin derivatives (including rosin esters, unsaturated fatty acid-modified rosins and unsaturated fatty acid-modified rosin esters); and metal salts of rosins or various abovementioned rosin derivatives. Specific examples of rosin esters include methyl esters, triethylene glycol esters, glycerin esters, and pentaerythritol esters of unmodified rosins or modified rosins (hydrogenated rosins, disproportionated rosins, polymerized rosins, and the like).

Examples of the hydrocarbon-based tackifier resin include various hydrocarbon resins such as aliphatic hydrocarbon resins, aromatic hydrocarbon resins, aliphatic cyclic hydrocarbon resins, aliphatic/aromatic petroleum resins (styrene-olefin copolymers and the like), aliphatic/alicyclic petroleum resins, hydrogenated hydrocarbon resin, coumarone resins, and coumarone indene resins.

The softening point of the tackifier resin is not particularly limited. From the standpoint of improving the cohesiveness, in an embodiment, a tackifier resin having a softening point (softening temperature) of about 80° C. or higher (preferably, about 100° C. or higher) can be preferably used. The art disclosed herein can be preferably implemented in an embodiment in which more than 50% by weight (more preferably, more than 70% by weight, for example, more than 90% by weight) of the total amount of the tackifier resin (taken as 100% by weight) contained in the PSA layer is taken by a tackifier resin having the abovementioned softening point. For example, a phenolic tackifier resin (terpene phenolic resin or the like) having such a softening point can be advantageously used. The tackifier resin may include, for example, a terpene phenolic resin having a softening point of about 135° C. or higher (furthermore, about 140° C. or higher). The upper limit of the softening point of the tackifier resin is not particularly limited. From the standpoint of improving the adhesion to an adherend, in an embodiment, a tackifier resin having a softening point of about 200° C. or lower (more preferably about 180° C. or lower) can be preferably used. In a preferable embodiment, the softening point of the tackifier resin (typically terpene-phenol resin) is below 130° C., for instance, 120° C. or below. The use of a tackifier resin having such a relatively low softening point may improve the dispersity of the colorant, for instance, a black colorant (typically carbon black). The softening point of the tackifier resin can be measured based on a softening point test method (ring and ball method) prescribed in JIS K 2207.

In a preferable embodiment, the tackifier resin includes one or two or more phenolic tackifier resins (typically, a terpene phenolic resin). The art disclosed herein can be preferably implemented, for instance, in an embodiment where a terpene phenolic resin corresponds to about 25% by weight or more (more preferably, about 30% by weight or more) with the total amount of the tackifier resin being 100% by weight. About 50% by weight or more of the total amount of the tackifier resin may be a terpene phenolic resin, and about 80% by weight or more (e.g. about 90% by weight or more) may be a terpene phenolic resin. Substantially all of the tackifier resin (e.g. about 95% by weight to 100% by weight, even about 99% by weight to 100% by weight) may be a terpene phenolic resin.

While no particular limitations are imposed, in an embodiment of the art disclosed herein, the tackifier resin may include a tackifier resin having a hydroxyl value higher than 20 mg KOH/g. Among such tackifier resins, a tackifier resin having a hydroxyl value of 30 mg KOH/g or more is preferable. Hereinafter, a tackifier resin having a hydroxyl value of 30 mg KOH/g or more may be referred to as a "high-hydroxyl-value resin". With the tackifier resin including such a high-hydroxyl-value resin, a PSA layer can be obtained that shows excellent adhesion to the adherend and high cohesive strength. In an embodiment, the tackifier resin may include a high-hydroxyl-value resin having a hydroxyl value of 50 mg KOH/g or higher (more preferably, 70 mg KOH/g or higher). As the hydroxyl value, it is possible to use a value determined by the potentiometric titration method specified in JIS K0070:1992. Details of the method are described below.

As the high-hydroxyl-value resin, a species having at least a prescribed hydroxyl value can be used among the various tackifier resins described earlier. The high-hydroxyl-value resins can be used singly as one species or in a combination of two or more species. For example, a phenolic tackifier resin having a hydroxyl value of 30 mgKOH/g or higher can be preferably used as the high-hydroxyl-value resin. In a preferable embodiment, a terpene phenolic resin having a hydroxyl value of 30 mgKOH/g or higher is used as the tackifier resin. The terpene phenolic resin is advantageous because the hydroxyl value can be controlled at will through the copolymerization ratio of phenol.

The maximum hydroxyl value of the high-hydroxyl-value resin is not particularly limited. From the standpoint of the compatibility with the base polymer and the like, the hydroxyl value of the high-hydroxyl-value resin is usually suitably about 200 mgKOH/g or lower, preferably about 180 mgKOH/g or lower, more preferably about 160 mgKOH/g or lower, and even more preferably about 140 mgKOH/g or lower. The art disclosed herein can be preferably implemented in an embodiment in which the tackifier resin includes a high-hydroxyl-value resin (e.g. a phenol-based tackifier resin, preferably a terpene phenolic resin) having a hydroxyl value of 30 mgKOH/g to 160 mgKOH/g. In an embodiment, a high-hydroxyl-value resin having a hydroxyl value of 30 mgKOH/g to 80 mgKOH/g (e.g. 30 mgKOH/g to 65 mgKOH/g) can be preferably used. In another embodiment, a high-hydroxyl-value resin having a hydroxyl value of 70 mgKOH/g to 140 mgKOH/g can be preferably used.

While no particular limitations are imposed, when a high-hydroxyl-value resin is used, the ratio of high-hydroxyl-value resin (e.g. a terpene phenolic resin) to the entire tackifier resin in the PSA layer can be, for example, about 25% by weight or higher, preferably about 30% by weight or higher, and more preferably about 50% by weight or higher (e.g. about 80% by weight or higher, typically about 90% by weight or higher). Substantially all of the tackifier resin (e.g. about 95% by weight to 100% by weight, more preferably about 99% by weight to 100% by weight) may be a high-hydroxyl-value resin.

When the PSA layer includes a tackifier resin, the amount of the tackifier resin used is not particularly limited, and may be suitably selected in a range of, for example, about 1 part to 100 parts by weight to 100 parts by weight of the base polymer. From the standpoint of favorably obtaining the effect to increase the peel strength, the amount of the tackifier resin used to 100 parts by weight of the base polymer (e.g. acrylic polymer) is usually suitably 5 parts by weight or greater, preferably 10 parts by weight or greater, or possibly 15 parts by weight or greater. For instance, in the colorant-containing PSA layer, the dispersity of the colorant (e.g. carbon black) tends to increase with inclusion of a prescribed amount of tackifier resin (e.g. a terpene-phenol resin having a softening point of 120° C. or lower). From the standpoint of the heat-resistant cohesive strength, the amount of the tackifier resin used to 100 parts by weight of the base polymer (e.g. acrylic polymer) is usually suitably 50 parts by weight or less, possibly 40 parts by weight or less, or even 30 parts by weight or less.

(Crosslinking Agent)

In the art disclosed herein, the PSA composition used for forming the PSA layer may comprise a crosslinking agent as necessary. The type of crosslinking agent is not particularly limited and a suitable species can be selected and used among heretofore known crosslinking agents. Examples of the crosslinking agent include isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. For the crosslinking agent, solely one species or a combination of two or more species can be used.

In a preferable embodiment, as the crosslinking agent, an isocyanate-based crosslinking agent is used in combination with at least one other species of crosslinking agent having a crosslinkable functional group different from that of the isocyanate-based crosslinking agent (or a "non-isocyanate-based crosslinking agent). According to the art disclosed herein, the combined use of isocyanate-based crosslinking agent and non-isocyanate-based crosslinking agent can favorably bring about both high heat-resistant cohesive strength and excellent metal corrosion inhibition, for instance, in an embodiment comprising a rust inhibitor such as azole-based rust inhibitor. The PSA layer in the art disclosed herein may include the crosslinking agent, for instance, in a crosslinked form, in a pre-crosslinked form, in a partially crosslinked form, in an intermediate or combined form of these. In typical, the crosslinking agent is included in the adhesive layer mostly in a crosslinked form.

As the isocyanate-based crosslinking agent, it is preferable to use a polyfunctional isocyanate (which refers to a compound having an average of two or more isocyanate groups per molecule, including a compound having an isocyanurate structure). For the isocyanate-based crosslinking agent, solely one species or a combination of two or more species can be used.

Examples of the polyfunctional isocyanate include aliphatic polyisocyanates, alicyclic polyisocyanates, and aromatic polyisocyanates.

Examples of an aliphatic polyisocyanate include 1,2-ethylene diisocyanate; tetramethylene diisocyanates such as 1,2-tetramethylene diisocyanate, 1,3-tetramethylene diisocyanate, 1,4-tetramethylene diisocyanate, etc.; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, 2,5-hexamethylene diisocyanate, etc.; 2-methyl-1,5-pentane diisocyanate, 3-methyl-1,5-pentane diisocyanate, and lysine diisocyanate.

Examples of an alicyclic polyisocyanate include isophorone diisocyanate; cyclohexyl diisocyanates such as 1,2-cyclohexyl diisocyanate, 1,3-cyclohexyl diisocyanate, 1,4-cyclohexyl diisocyanate, etc.; cyclopentyl diisocyanates such as 1,2-cyclopentyl diisocyanate, 1,3-cyclopentyl diisocyanate etc.; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of an aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

A preferable example of the polyfunctional isocyanate has an average of three or more isocyanate groups per molecule. Such a tri-functional or higher polyfunctional isocyanate can be a multimer (typically a dimer or a trimer), a derivative (e.g., an adduct of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, and polyester polyisocyanate. Commercially available polyfunctional isocyanates include product name DURANATE TPA-100 available from Asahi Kasei Chemicals Corporation and product names CORONATE L, CORONATE HL, CORONATE HK, CORONATE HX, and CORONATE 2096 available from Tosoh Corporation.

The amount of isocyanate-based crosslinking agent used is not particularly limited. For example, it can be about 0.5 part by weight or greater to 100 parts by weight of the base polymer. From the standpoint of obtaining higher cohesive strength (particularly heat-resistant cohesive strength), the amount of isocyanate-based crosslinking agent used to 100 parts by weight of the base polymer may be, for example, 1.0 part by weight or greater, or preferably 1.5 parts by weight or greater (typically 2.0 parts by weight or greater, e.g. 2.5 parts by weight or greater). From the standpoint of obtaining tighter adhesion to the adherend, the amount of the isocyanate-based crosslinking agent used is usually suitably 10 parts by weight or less, 8 parts by weight or less, or even 5 parts by weight or less to 100 parts by weight of the base polymer.

There are no particular limitations to the type of non-isocyanate-based crosslinking agent used in combination with the isocyanate-based crosslinking agent. A suitable species can be selected and used among the crosslinking agents described above. The non-isocyanate-based crosslinking agents can be used singly as one species or in a combination of two or more species.

In a preferable embodiment, an epoxy-based crosslinking agent can be used as the non-isocyanate-based crosslinking agent. As the epoxy-based crosslinking agent, a compound having two or more epoxy groups in a molecule can be used without particular limitation. An epoxy-based crosslinking agent having 3 to 5 epoxy groups in a molecule is preferable. Epoxy-based crosslinking agents can be used singly as one species or in a combination of two or more species.

Specific examples of the epoxy-based crosslinking agent include, but are not limited to, N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercially available epoxy-based crosslinking agents include product names TETRAD-C and TETRAD-X both available from Mitsubishi Gas Chemical Co., Inc., product name EPICLON CR-5L available from DIC Corp., product name DENACOL EX-512 available from Nagase ChemteX Corporation, and product name TEPIC-G available from Nissan Chemical Industries, Ltd.

The amount of the epoxy-based crosslinking agent to be used is not particularly limited. The amount of the epoxy-based crosslinking agent to be used can be, for example, more than 0 part by weight and about 1 part by weight or less (typically about 0.001 part to 0.5 part by weight) to 100 parts by weight of the base polymer. From the standpoint of favorably obtaining the effect to increase the cohesive strength, the amount of epoxy-based crosslinking agent used is usually suitably about 0.002 part by weight or greater, preferably about 0.005 part by weight or greater, or more preferably about 0.008 part by weight or greater to 100 parts by weight of the base polymer. From the standpoint of obtaining tighter adhesion to an adherend, the amount of the epoxy-based crosslinking agent used is usually suitably about 0.2 part by weight or less, preferably about 0.1 part by weight or less, more preferably less than about 0.05 part by weight, or even more preferably less than about 0.03 part by weight (e.g. about 0.025 part by weight or less) to 100 parts by weight of the base polymer.

In the art disclosed herein, the relative amounts of isocyanate-based crosslinking agent and non-isocyanate-based crosslinking agent (e.g. epoxy-based crosslinking agent) are not particularly limited. For instance, the amount of non-isocyanate-based crosslinking agent can be about $1/50$ or less of the amount of isocyanate-based crosslinking agent. From the standpoint of more favorably bringing about tight adhesion to the adherend and cohesive strength, the amount of non-isocyanate-based crosslinking agent is suitably about $1/75$ or less, or preferably about $1/100$ or less (e.g. $1/150$ or less) of the amount of isocyanate-based crosslinking agent by weight. From the standpoint of favorably obtaining the effect of the combined use of isocyanate-based crosslinking agent and non-isocyanate-based crosslinking agent (e.g. epoxy-based crosslinking agent), the amount of the non-isocyanate-based crosslinking agent is usually suitably about $1/1000$ or more, for example, about $1/500$ or more of the amount of isocyanate-based crosslinking agent.

The total amount of crosslinking agent used is not particularly limited. For instance, it can be about 10 parts by weight or less to 100 parts by weight of the base polymer (favorably an acrylic polymer) or selected from a range of preferably about 0.005 part to 10 parts by weight, or more preferably about 0.01 part to 5 parts by weight.

(Rust Inhibitor)

The PSA layer according to a preferable embodiment may include a rust inhibitor. As the rust inhibitor, an azole-based rust inhibitor can be preferably used. Such a PSA layer is preferable in a case that requires metal corrosion inhibition such as when applied to a metal. A preferable azole-based rust inhibitor comprises an azole-based compound (a five-membered cyclic aromatic compound having two or more hetero atoms with at least one of which being a nitrogen atom) as an active ingredient. As the azole-based compound, a suitable species can be selected among those used heretofore as rust inhibitors for metals such as copper.

Examples of the azole-based compound include azoles such as imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, and 1,2,3,4-thiatriazole; derivatives thereof, amine salts thereof, and metal salts thereof. Examples of azole derivatives include compounds having a structure including a condensed ring of an azole ring and another ring such as a benzene ring. Specific examples thereof include indazole, benzimidazole, benzotriazole (that is, 1,2,3-benzotriazole having a structure in which an azole ring of 1,2,3-triazole is condensed with a benzene ring), and benzothiazole, and derivatives thereof such as alkylbenzotriazoles (e.g. 5-methylbenzotriazole, 5-ethylbenzotriazole, 5-n-propylbenzotriazole, 5-isobutylbenzotriazole, and 4-methylbenzotriazole), alkoxybenzotriazoles (e.g. 5-methoxybenzotriazole), alkylaminobenzotriazoles, alkylaminosulfonylbenzotriazoles, mercaptobenzotriazole, hydroxybenzotriazole, nitrobenzotriazoles (e.g. 4-nitrobenzotriazole), halobenzotriazoles (e.g. 5-chlorobenzotriazole), hydroxyalkylbenzotriazoles, hydroxybenzotriazoles, aminobenzotriazoles, (substituted aminomethyl)-tolyltriazoles, carboxybenzotriazole, N-alkylbenzotriazoles, bisbenzotriazoles, naphthotriazoles, mercaptobenzothiazole, and aminobenzothiazole, amine salts thereof, and metal salts thereof. Other examples of azole derivatives include an azole derivative having a non-condensed ring structure, for example, compounds with a structure having a substituent on a non-condensed azole ring, for example, 3-amino-1,2,4-triazole and 5-phenyl-1H-tetrazole. The azole compounds can be used singly as one species or in a combination of two or more species.

Preferable examples of compounds that can be used as the azole-based rust inhibitor include benzotriazole-based rust inhibitors including a benzotriazole compound as an active ingredient. The art disclosed herein can be preferably implemented, for example, in an embodiment in which the base polymer is an acrylic polymer and the rust inhibitor is a benzotriazole-based rust inhibitor. In such an embodiment, a PSA sheet can be favorably obtained that provides satisfactory metal corrosion inhibition and excellent holding properties. Favorable examples of the benzotriazole-based compound include 1,2,3-benzotriazole, 5-methylbenzotriazole, 4-methylbenzotriazole, and carboxybenzotriazole.

Examples of the non-azole-based rust inhibitor possibly in the PSA layer disclosed herein are not particularly limited. Examples include amine compounds, nitrites, ammonium benzoate, ammonium phthalate, ammonium stearate, ammonium palmitate, ammonium oleate, ammonium carbonate, salts of dicyclohexylaminebenzoic acid, urea, urotropin, thiourea, phenyl carbamate, and cyclohexylammonium-N-cyclohexyl carbamate (CHC). These rust inhibitors which are not azole compounds (non-azole-based rust inhibitors) can be used singly as one species or in a combination of two or more species. Alternatively, the art disclosed herein can also preferably be implemented in an embodiment that uses essentially no non-azole-based rust inhibitor.

The amount of the azole-based rust inhibitor (favorably an azole-based rust inhibitor, e.g. a benzotriazole-based rust inhibitor) is not particularly limited, and can be, for example, 0.01 part by weight or greater (typically 0.05 parts by weight or greater) to 100 parts by weight of the base polymer. From the standpoint of obtaining greater inhibition of metal corrosion, the amount may be 0.1 part by weight or greater, 0.3 part by weight or greater, or 0.5 part by weight or greater. From the standpoint of increasing the cohesive strength (e.g. heat-resistant cohesive strength) of the PSA, the amount of azole-based rust inhibitor is usually suitably less than 8 parts by weight, possibly 6 parts by weight or less, or even 5 parts by weight or less to 100 parts by weight of the base polymer.

(Other Additives)

The PSA composition may include, as necessary, various additives which are common in the field of PSA compositions, such as a leveling agent, a crosslinking aid, a plasticizer, a softener, an antistatic agent, an aging-preventing agent, an ultraviolet absorber, an antioxidant, and a light stabilizer. As for these various additives, heretofore known species can be used by conventional methods, and the present invention is not particularly characterized thereby. Therefore, detailed description is omitted.

The PSA layer disclosed herein can be formed from an aqueous PSA composition, a solvent-based PSA composition, a hot-melt PSA composition, and an active energy ray-curable PSA composition. The aqueous PSA composition refers to a PSA composition that comprises a PSA (PSA layer-forming components) in a solvent whose primary component is water (an aqueous solvent), typically including a so-called water-dispersed PSA composition (in which the PSA is at least partially dispersed in water). Further, the solvent-based PSA composition refers to a PSA composition that comprises a PSA in an organic solvent. From the standpoint of adhesive properties and the like, the art disclosed herein can be preferably implemented in an embodiment in which the PSA layer is formed from a solvent-based PSA composition.

(Formation of PSA Layer)

The PSA layer disclosed herein can be formed by a conventionally known method. For example, a direct method can be used where the PSA composition is directly provided (typically applied) to a substrate film as described earlier and allowed to dry to form a PSA layer. Alternatively, a transfer method can be employed where the PSA composition is provided to a releasable surface (e.g. a release face) and allowed to dry to form a PSA layer on the surface and the PSA layer is transferred to a substrate film. From the standpoint of the productivity, the transfer method is preferable. Possible release faces include the surface of a release liner and the backside of the substrate film which has been treated with release agent. The PSA layer disclosed herein is typically formed in a continuous form, but not limited to such a form. For instance, the PSA layer may be formed in a regular or random pattern of dots, stripes, etc.

The PSA composition can be applied with a heretofore known coater, for instance, a gravure roll coater, die coater, and bar coater. Alternatively, the PSA composition can be applied by immersion, curtain coating, etc.

From the standpoints of accelerating the crosslinking reaction, improving production efficiency, and the like, it is preferable to dry the PSA composition under heating. The drying temperature can be, for example, about 40° C. to 150° C., and usually preferably about 60° C. to 130° C. After dried, the PSA composition can be subjected to aging to adjust the distribution or migration of components within the PSA layer, to allow the crosslinking reaction to proceed, to reduce possible distortion in the PSA layer, and so on.

The thickness of the PSA layer is not particularly limited. From the standpoint of preventing the PSA sheet from becoming excessively thick, the thickness of the PSA layer is usually suitably about 100 µm or less, preferably about 70 µm or less, and more preferably about 50 µm or less (e.g. about 30 µm or less). The PSA layer's thickness can be about 20 µm or less, for instance, about 15 µm or less, even about 10 µm or less, or about 5 µm or less (e.g. 3 µm or less). For instance, with decreasing thickness of the PSA layer, the light-blocking properties will degrade in the thickness direction while the light transmission tends to be of little problem in XY direction. In such an embodiment, the light transmittances in the XYZ directions are suitably set in accordance with the purpose and the thickness of the PSA layer. The minimum thickness of the PSA layer is not particularly limited. From the standpoint of the tightness of adhesion to an adherend, it is advantageously about 1 µm or greater, suitably about 3 µm or greater, preferably about 5 µm or greater, more preferably about 7 µm or greater, or yet more preferably about 12 µm or greater (e.g. about 15 µm or greater). When the PSA layer has light-blocking properties, this may further decrease the light transmission of the PSA layer in the Z direction. When the PSA sheet disclosed herein is made in an embodiment having the first and second PSA layers, their thicknesses may be the same or different.

<Release Liner>

In the art disclosed herein, a release liner can be used in formation of the PSA layer, preparation of the PSA sheet, storage, distribution and processing of the unused PSA sheet, etc. The release liner is not particularly limited, and examples thereof include a release liner having a release layer on the surface of a liner substrate such as a resin film or paper, and a release liner made of a low-adhesive material such as a fluoropolymer (polytetrafluoroethylene, etc.) or a polyolefin resin (polyethylene, polypropylene, etc.). The release layer can be formed, for example, by subjecting the liner substrate to surface treatment with a release agent such as a silicone-based, long-chain alkyl-based, fluorine-based agent kind, or molybdenum sulfide.

<Thickness of PSA Sheet>

The total thickness of the PSA sheet disclosed herein (including PSA layer(s), a support substrate if any, but no release liner) is not particularly limited. The total thickness of the PSA sheet can be, for example, about 300 µm or less. From the standpoint of making it thinner, the thickness is usually suitably about 200 µm or less. Although the minimum thickness of the PSA sheet is not particularly limited, the thickness is usually about 1 µm or greater, suitably, for instance, about 3 µm or greater, preferably about 6 µm or greater, or more preferably about 10 µm or greater (e.g. about 15 µm or greater).

In a preferable embodiment, the total thickness of the PSA sheet is less than 150 µm, more preferably about 120 µm or less, yet more preferably about 70 µm or less, or particularly preferably less than 50 µm (e.g. about 40 µm or less); it can be, for instance, 35 µm or less, about 25 µm or less, even about 15 µm or less, or about 10 µm or less (e.g. about 7 µm or less). The effect of the art disclosed herein to block light can be preferably obtained even in an embodiment using such a thin PSA sheet.

To the total thickness of the PSA sheet, the ratio of the combined thickness of PSA layer(s) in the PSA sheet is not particularly limited. Here, the combined thickness of PSA layer(s) in the PSA sheet refers to the total thickness of PSA layer(s) provided to the two faces of thee substrate film. In an adhesively single-faced PSA sheet having a PSA layer only on one face of the substrate film, the PSA layer's thickness on the other face is zero and the thickness on the one face is equal to the total thickness of PSA layer(s). The art disclosed herein can be implemented in an embodiment where, for instance, the ratio of the combined thickness of PSA layer(s) to the total thickness of the PSA sheet is 40% or higher (preferably 50% or higher, typically higher than 50%, more preferably 60% or higher, or yet more preferably 70% or higher). In such an embodiment, a higher level of impact resistance tends to be obtained even with a relatively small width in comparison to the total thickness of the PSA sheet. In an embodiment, the ratio of the combined thickness of PSA layers to the total thickness of the PSA sheet can be 75% or higher, or even 80% or higher. The maximum ratio of the combined thickness of PSA layers to the total thickness of the PSA sheet is not particularly limited. It is usually suitably 95% or lower, or preferably 90% or lower.

<Properties of PSA Sheet>

The PSA sheet disclosed herein has a peel strength to polyethylene terephthalate (PET) (or a "to-PET peel strength" hereinafter) of usually about 5 N/25 mm or greater, or suitably about 8 N/25 mm or greater, determined at room temperature (23° C.) with the adherend being PET. The to-PET peel strength is preferably about 10 N/25 mm or greater, more preferably about 12 N/25 mm or greater, or yet more preferably about 14 N/25 mm or greater (e.g. about 15 N/25 mm or greater). Such a PSA sheet is suitable for fixing a member whose surface is at least partially formed of a resin material such as PET or a polyimide. Although the maximum to-PET peel strength is not particularly limited, it may be, for example, 40 N/25 mm or less, or even 30 N/25 mm or less.

The to-PET peel strength can be determined as follows: In particular, a 50 µm thick PET film (product name LUMIRROR S10 available from Toray Industries, Inc.) fixed to a stainless steel plate with double-faced adhesive tape is used as an adherend. The PSA sheet is cut to a size of 25 mm in width and 100 mm in length to obtain a measurement sample. In an environment at 23° C. and 50% RH, the measurement sample's adhesive face is press-bonded to the adherend surface (PET film surface) with a 2 kg roller moved back and forth once. The resultant is then left standing for 30 min in the same environment. Using a universal tensile/compression tester, based on JIS Z 0237: 2009, the peel strength (N/25 mm) is determined at a tensile speed of 300 mm/min at a peel angle of 180°. As the universal tensile/compression tester, for example, TENSILE COMPRESSION TESTER, TG-1 kN available from Minebea Co., Ltd. can be used. With a double-faced PSA sheet, the PSA sheet's other adhesive face (on the reverse side of the adhesive face of interest) can be backed with a suitable resin film applied thereto and the backed PSA sheet is cut to the size described above to prepare a measurement sample. As the backing film, for example, product name LUMIRROR S10, available from Toray Industries, Inc. may be used.

<Applications>

The PSA sheet disclosed herein can be processed with excellent precision; and therefore, it is suitable for applications in which it can be processed to have a specific shape or a small width, for instance, for fixing components of portable electronic devices. Light-blocking properties may be necessary with the PSA sheet because some electronics including such portable electronic devices include luminous components for image displays, etc. With the support substrate having a limited thickness, the PSA sheet disclosed herein may serve the needs for making portable electronic devices thinner and lighter.

Non-limiting examples of the portable electronic device include cell phones, smartphones, tablet PCs, notebook PCs, various wearable devices (e.g. wrist wears put on wrists such as wrist watches; modular devices attached to bodies with a clip, strap, etc.; eye wears including glass-shaped wears (monoscopic or stereoscopic, including head-mounted pieces); clothing types worn as, for instance, accessories on shirts, socks, hats/caps, etc.; ear wears such as earphones put on ears; etc.), digital cameras, digital video cameras, acoustic equipment (portable music players, IC recorders, etc.), calculators (e.g. pocket calculators), handheld game devices, electronic dictionaries, electronic notebooks, electronic books, vehicle navigation devices, portable radios, portable TVs, portable printers, portable scanners, and portable modems. As used herein, being "portable" means not just providing simple mobility, but further providing a level of portability that allows an individual (average adult) to carry it relatively easily.

Among these portable electronic devices, in a portable electronic device having a pressure-sensitive sensor, the PSA sheet disclosed herein can be preferably used for fixing the pressure-sensitive sensor and other components. In a preferable embodiment, the PSA sheet can be used for fixing a pressure-sensitive sensor and other components in an electronic device (typically, a portable electronic device) equipped with a function to identify an absolute position on a panel corresponding to a screen (typically, a touch panel) with a device to specify the position on the screen (typically, a pen type or a mouse type device) and a device to detect the position.

The PSA sheet disclosed herein is also suitable for an application in which it is placed on the back of a display screen (display) such as a touch panel display in a portable electronic device to prevent light reflection on the display screen. Placement of the PSA sheet disclosed herein on the back of the display screen (display) can prevent degradation of display visibility regardless of how the portable electronic device is used. The refection may be caused by a metallic component placed on the backside of the display screen. For instance, when the PSA sheet disclosed herein is used for the metallic component and the display, light-blocking properties can be obtained along with attachment of the components.

There are no particular limitations to the material forming the article (e.g. a backing member such as an electromagnetic shielding material, a reinforcing plate, etc.) to be fixed to the pressure-sensitive sensor, display and the like. Examples include metals such as copper, silver, gold, iron, tin, palladium, aluminum, nickel, titanium, chromium, zinc and an alloy of two or more species among these; various resin materials (typically, plastic materials) such as polyimide resin, acrylic resin, polyether nitrite resin, polyether sulfone resin, polyester resin (apolyethylene terephthalate resin, polyethylene naphthalate resin, etc.), polyvinyl chloride resin, polyphenylene sulfide resin, polyether ether ketone resin, polyamide resin (so-called aramid resin, etc.), polyarylate resin, polycarbonate resin, and liquid crystal polymer; inorganic materials such as alumina, zirconia, soda glass, silica glass and carbon. Among them, metals such as copper, aluminum, and stainless steel, and resin materials (typically plastic materials) such as polyimide resin, aramid resin, and polyphenylene sulfide resin are widely used. The article to be fixed may have a single layer structure or a multilayer structure, and its surface (face to be attached) to which the PSA sheet is applied may be subjected to various types of surface treatment. The article to be fixed is not particularly limited. One example is a backside component having a thickness of about 1 μm or greater (typically, 5 μm or greater, for example, 60 μm or greater, and also 120 μm or greater) and about 1500 μm or less (e.g. 800 μm or less), but these values are not particularly limiting.

The PSA sheet disclosed herein has excellent light-blocking properties in the XYZ directions; and therefore, it is preferably used in electronic devices that include various light sources such as LED (light-emitting diodes) and luminous components such as self-luminous organic EL (electroluminescence). For instance, it can be preferably used in an electronic device (typically a portable electronic device) having a liquid crystal display that requires certain optical properties. More specifically, it can be preferably used in a liquid crystal display having a liquid crystal display module unit (LCD unit) and a backlight module unit (BL unit) to join the LCD and BL units.

Figure 2:
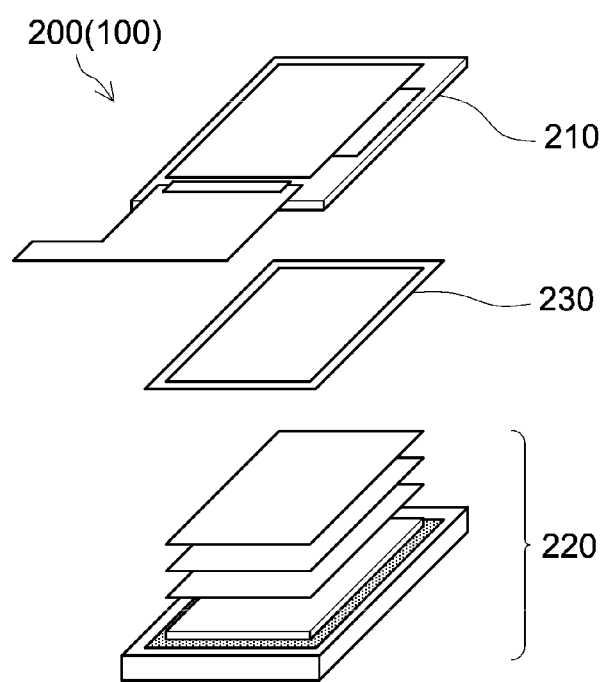
FIG. 2 shows an exploded perspective view schematically illustrating a constitutional example of the liquid crystal display.

FIG. 2 shows an exploded perspective view schematically illustrating a constitutional example of the liquid crystal display. As shown in FIG. 2, a liquid crystal display 200 having a portable electronic device 100 comprises an LCD unit (component) 210 and a BL unit (component) 220. Liquid crystal display 200 further comprises a PSA sheet 230. In this constitutional example, PSA sheet 230 is in a form of an adhesively double-faced PSA sheet (double-faced PSA sheet) processed into a frame shape and is placed between BL unit 220 and LCD unit 210 joining the two. It is noted that BL unit 220 typically includes, besides a light source, a reflective sheet, a light-guiding panel, a diffusion sheet, a prism sheet, etc.

The PSA sheet disclosed herein can be processed into joints having various shapes and used, for instance, for joining the LCD and BL units as well as for other joining purposes. In a preferable embodiment, the joint has a narrow segment having a width less than 2.0 mm (e g less than 1.0 mm) The PSA sheet disclosed herein may show excellent light-blocking properties in the XYZ directions. Thus, it can provide good performance (impact resistance, light-blocking properties, etc.) even when used as a joint having a shape (e.g. a frame shape) with such a narrow segment. In an embodiment, the narrow segment may have a width of 0.7 mm or less, 0.5 mm or less, or even about 0.3 mm or less. The minimum width of the narrow segment is not particularly limited. From the standpoint of the handling properties of the PSA sheet, it is usually suitably 0.1 mm or greater (typically 0.2 mm or greater).

The narrow segment is typically linear. Here, the concept of being linear encompasses shapes that are straight, curved, bent (e.g. L-shaped) and also ring-shaped (frame-shaped, circular, etc.) as well as their composite or intermediate shapes. The ring shape is not limited to a curved shape. The concept encompasses, for instance, a ring shape of which part or all is straight, such as a shape that conforms to the circumference of a square (i.e. a frame shape) and a shape that conforms to a sector shape. The narrow segment is not particularly limited in length. For instance, in an embodiment where the narrow segment has a length of 10 mm or greater (typically 20 mm or greater, e.g. 30 mm or greater), the effect of the art disclosed herein can be favorably obtained.

The matters disclosed by this description include the following:

(1) A liquid crystal display having a liquid crystal display module unit, a backlight module unit, and an adhesively double-faced PSA sheet joining the liquid crystal display module unit and the backlight module unit, wherein the PSA sheet comprises a support substrate having a thickness less than 75 μm, a first PSA layer placed on a first face of the support substrate and a second PSA layer placed on a second face of the support substrate, and the PSA sheet has light transmittances of 0.04% or lower in XY and Z directions thereof, wherein the XY direction is a direction n included in the plane of the pressure-sensitive adhesive sheet, and the Z direction is the direction running through the thickness of the PSA sheet.

(2) The liquid crystal display according to (1) above, wherein the light transmittance in the XY direction is 0.01% or lower.

(3) The liquid crystal display according to (1) or (2), wherein the light transmittance in the Z direction is 0.01% or lower.

(4) The liquid crystal display according to any of (1) to (3) above, wherein the support substrate has a light transmittance of 5.0% or lower in its Z direction and the PSA layer has a light transmittance of 4.0% or lower in its Z direction.

(5) The liquid crystal display according to any of (1) to (4) above, wherein the support substrate comprises a black colorant.
(6) The liquid crystal display according to any of (1) to (5) above, wherein the support substrate is a resin film substrate comprising a black colorant.
(7) The liquid crystal display according to any of (1) to (6) above, wherein the PSA layer comprises a black colorant.
(8) The liquid crystal display according to any of (1) to (7) above, wherein the PSA layer has a thickness of 1.5 μm to 40 μm.
(9) The liquid crystal display according to any of (1) to (8) above, wherein the light transmittance in the Z direction of the support substrate is 1% or higher and the light transmittance in the Z direction of the PSA layer is 1% or higher.
(10) The liquid crystal display according to any of (1) to (9) above, wherein the PSA sheet has a total thickness less than 150 μm.
(11) A PSA sheet that comprises a support substrate having a thickness less than 75 μm and a PSA layer placed at least on one face of the support substrate, wherein
the PSA sheet has light transmittances of 0.04% or lower in XY and Z directions thereof, wherein the XY direction is a direction n included in the plane of the pressure-sensitive adhesive sheet, and the Z direction is the direction running through the thickness of the PSA sheet.
(12) The PSA sheet according to (11) above, wherein the light transmittance in the XY direction is 0.01% or lower.
(13) The PSA sheet according to (11) or (12) above, wherein the light transmittance in the Z direction is 0.01% or lower.
(14) The PSA sheet according to any of (11) to (13) above, wherein the support substrate has a light transmittance of 5.0% or lower in its Z direction and the PSA layer has a light transmittance of 4.0% or lower in its Z direction.
(15) The PSA sheet according to any of (11) to (14) above, wherein the support substrate comprises a black colorant.
(16) The PSA sheet according to any of (11) to (15) above, wherein the support substrate is a resin film substrate comprising a black colorant.
(17) The PSA sheet according to any of (11) to (16) above, wherein the PSA layer comprises a black colorant.
(18) The PSA sheet according to any of (11) to (17) above, wherein the PSA layer has a thickness of 1.5 μm to 40 μm.
(19) The PSA sheet according to any of (11) to (18) above, used in an electronic device comprising a luminous component.
(20) The PSA sheet according to any of (11) to (19) above, having a total thickness less than 150 μm.
(21) The PSA sheet according to any of (11) to (20) above, wherein the PSA layer is an acrylic PSA layer comprising an acrylic polymer.
(22) The PSA sheet according to any of (11) to (21) above, wherein the PSA layer comprises an acrylic polymer accounting for more than 50% by weight of polymers in the PSA layer, wherein the acrylic polymer comprises, as a monomer, at least 70% (by weight) acrylic (meth)acrylate represented by an formula (1);

$$CH_2=C(R^1)COOR^2 \quad (1)$$

(in the formula (1), $R^1$ in the formula (1) is a hydrogen atom or a methyl group; and $R^2$ is an acyclic alkyl group having 1 to 20 carbon atoms.
(23) The PSA sheet according to (22) above, wherein the acrylic polymer further comprises a carboxy group-containing monomer as the monomer.
(24) The PSA sheet according to any of (11) to (23) above, wherein the PSA layer is formed from a PSA composition comprising at least one species of crosslinking agent selected from the group consisting of an isocyanate-based crosslinking agent, an epoxy-based crosslinking agent, an oxazoline-based crosslinking agent, an aziridine-based crosslinking agent, a melamine-based crosslinking agent, a peroxide-based crosslinking agent, a urea-based crosslinking agent, a metal alkoxide-based crosslinking agent, a metal chelate-based crosslinking agent, a metal salt-based crosslinking agent, a carbodiimide-based crosslinking agent, a hydrazine-based crosslinking agent, and an amine-based crosslinking agent.
(25) The PSA sheet according to any of (11) to (24) above, wherein the PSA layer comprises at least one species of tackifier resin selected from the group consisting of a rosin-based tackifier resin, a terpene-based tackifier resin, a hydrocarbon-based tackifier resin, an epoxy-based tackifier resin, a polyamide-based tackifier resin, an elastomer-based tackifier resin, a phenolic tackifier resin, and a ketone-based tackifier resin.
(26) The PSA sheet according to any of (11) to (25) above, wherein the PSA layer comprises carbon black as a black colorant.
(27) The PSA sheet according to any of (11) to (26) above, used in an electronic device comprising a luminous component.
(28) The PSA sheet according to any of (11) to (27) above, used for fixing a component in a portable electronic device.

EXAMPLES

Several examples relating to the present invention will be described hereinbelow, but the present invention is not to be limited to these examples. In the description below, "parts" and "%" are by weight unless otherwise specified.
<Test Methods>
[XY-Directional Light Transmittance]
With a hand roller, layers of each PSA sheet are laminated with care not to trap air bubbles to obtain a PSA sheet laminate having a total thickness of at least 25 mm up to 30 mm. The laminate is cut to a 0.5 mm wide strip and the resultant is used as a measurement sample. The light transmittance is determined using a spectrophotometer, by illuminating a side (an edge face) of the measurement sample (0.5 mm wide PSA sheet laminate) with vertical incident light of 380 nm to 780 nm in wavelength and measuring the intensity of the light transmitted to the opposite edge face. As the spectrophotometer, a spectrophotometer (model number U-4100) available from Hitachi High-Technologies Corporation or a comparable product is used.
[Z-Directional Light Transmittance]
This can be obtained by measuring the light transmittance in the thickness direction of a PSA sheet prepared. The light transmittance measurement conditions (wavelength, devices used, etc.) are the same as the measurement of XY-directional light transmittance. The same method is also used for determining the Z-directional light transmittance of a support substrate. The Z-directional light transmittance of a PSA layer can be determined by removing the release liner from the release-lined PSA layer prior to transfer to the support substrate in the corresponding PSA sheet preparation and measuring the light transmittance of the resulting PSA layer by itself in the thickness direction.
[Evaluation of Ease of Processing]
A release-lined PSA sheet (adhesively double-faced PSA sheet) with each adhesive face protected with release liner is obtained and a blade is inserted from one release liner side (first release liner side) to cut the PSA sheet to a depth at which the second release liner on the reverse side is half-cut. After 60 seconds, the second release liner is removed from the laminate of the first release liner and the PSA sheet. The level of protrusion of the PSA at the cut edge faces of the PSA sheet is inspected with a microscope. When the PSA protrusion is 0.01 mm or greater, the sample is graded "Poor"; when less than 0.01 mm, the sample is graded "Good." The first and second release liners are not particularly limited. When the two release liners differ in removability, the one with light release force (release liner subjected to light release treatment) is designated as the first release liner and the one with heavy release force (release liner subjected to heavy release treatment) is designated as the second release liner between the two.

Example 1

(Preparation of PSA Composition)

Into a reaction vessel equipped with a stirrer, thermometer, nitrogen inlet, condenser and dropping funnel, were placed 95 parts of BA and 5 parts of AA as starting monomers and 233 parts of ethyl acetate as the polymerization solvent. The resulting mixture was allowed to stir under a nitrogen flow for two hours to eliminate oxygen from the polymerization system. Subsequently, was added 0.2 part of 2,2'-azobisisobutylonitrile as the polymerization initiator. The solution polymerization was carried out at 60° C. for eight hours to obtain a solution of acrylic polymer. The acrylic polymer had a Mw of about $70 \times 10^4$.

To the acrylic polymer solution, relative to 100 parts of acrylic polymer in the solution, were added 0.8 part of 1,2,3-benzotriazole (product name BT-120 available from Johoku Chemical Co., Ltd.), 5 parts of black pigment (product name ATDN101 BLACK available from Dainichiseika Color & Chemicals Mfg. Co., Ltd.), 20 parts of a terpene phenolic resin (product name YS POLYSTAR T-115, a softening point of about 115° C., a hydroxyl value of 30 mgKOH/g to 60 mgKOH/g, available from Yasuhara Chemical Co., Ltd.) as a tackifier resin, and 3 parts of an isocyanate-based crosslinking agent (product name CORONATE L, a 75% ethyl acetate solution of a trimethylolpropane/tolylene diisocyanate trimer adduct, available from Tosoh Corporation) and 0.01 part of an epoxy-based crosslinking agent (product name TETRAD-C, 1,3-bis(N,N-diglycidylaminomethyl)cyclohexane, available from Mitsubishi Gas Chemical Co., Inc.) as crosslinking agents. The resulting mixture was allowed to stir to prepare a PSA composition.

(Preparation of PSA Sheet)

As release liners, were obtained two sheets of polyester release film (product name DIAFOIL MRF, 38 μm thick, available from Mitsubishi Polyester Film Inc.) with one face being a release face treated with release agent. To the respective release faces of these release liners, the PSA composition was applied to dry thicknesses of 1.5 μm and allowed to dry at 100° C. for 2 min. PSA layers were thus formed on the release faces of the two release liners.

As the support substrate, was used 2 μm thick PET film (product name LUMIRROR available from Toray Corporation) with black pigment compounded therein. To the first and second faces of the support substrate, were adhered the PSA layers formed on the two release liners to prepare a substrate-supported double-faced PSA sheet according to this Example (transfer method). The release liners were left as they were on the PSA layers and used to protect the surfaces (adhesive faces) of the PSA layers.

Example 2

In this Example, as the support substrate, was used 5 μm thick PET film (product name LUMIRROR available from Toray Corporation) with black pigment compounded therein. The amount of the PSA composition applied to the release film was adjusted to obtain a dry thickness of 2.5 μm. Otherwise in the same manner as the preparation of the PSA sheet according to Example 1, was prepared a substrate-supported double-faced PSA sheet according to this Example.

Examples 3 and 4

The PSA layers were formed to have the thicknesses shown in Table 1. Otherwise in the same manner as the preparation of the PSA sheet according to Example 2, were prepared substrate-supported double-faced PSA sheets according to the respective Examples.

Example 5

In this Example, as the support substrate, was used 19 μm thick PET film (product name LUMIRROR available from Toray Corporation) with black pigment compounded therein. The amount of the PSA composition applied to the release film was adjusted to obtain a dry thickness of 15.5 μm. Otherwise in the same manner as the preparation of the PSA sheet according to Example 1, was prepared a substrate-supported double-faced PSA sheet according to this Example.

Example 6

In this Example, as the support substrate, was used 25 μm thick PET film (product name LUMIRROR available from Toray Corporation) with black pigment compounded therein. The amount of the PSA composition applied to the release film was adjusted to obtain a dry thickness of 38 μm. Otherwise in the same manner as the preparation of the PSA sheet according to Example 1, was prepared a substrate-supported double-faced PSA sheet according to this Example.

Example 7

In this Example, as the support substrate, were used 12 μm thick transparent PET film (product name LUMIRROR available from Toray Corporation) and a support substrate having a total thickness of approximately 17 μm and having a multilayer structure formed of the same PET film and a black color printed layer provided on the second face thereof. The black color printed layer was formed by gravure printing with a black colorant-containing ink composition. The amount of the PSA composition applied to the release film was adjusted to obtain a dry thickness of 16.5 μm. Otherwise in the same manner as the preparation of the PSA sheet according to Example 1, was prepared a substrate-supported double-faced PSA sheet according to this Example.

Example 8

The PSA composition prepared in Example 1 was applied to the release face of a 38 μm thick polyester release liner (product name DIAFOIL MRF available from Mitsubishi Polyester Film Inc.) and allowed to dry for 2 min at 100° C. to form a 30 μm thick PSA layer. To the PSA layer, was adhered the release face of a 25 μm thick polyester release liner (product name DIAFOIL MRF available from Mitsubishi Polyester Film Inc.). A 30 μm thick substrate-free double-faced PSA sheet was thus obtained, with each face protected with the polyester release liner.

The PSA sheet according to each Example was subjected to measurement and evaluation of the XY-directional and Z-directional light transmittances (%) thereof, the Z-directional light transmittances (%) of the PSA layer and support substrate, and the ease of processing. The results are shown in Table 1.

TABLE 1

| Layer composition | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| | | \multicolumn{7}{c}{Substrate-supported double-faced} | No substrate |
| PSA layer | Thickness (μm) | 1.5 | 2.5 | 7.5 | 12.5 | 15.5 | 38 | 16.5 | 30 |
| | Light transmittance in Z (%) | 3.1 | 1.4 | 0.02 | <0.01 | <0.01 | <0.01 | <0.01 | <0.01 |
| Support substrate | Thickness (μm) | 2 | 5 | 5 | 5 | 19 | 25 | 17 | — |
| | Light transmittance in Z (%) | 3.7 | 2.4 | 2.4 | 2.4 | <0.01 | <0.01 | <0.01 | — |
| PSA sheet | Total thickness (μm) | 5 | 10 | 20 | 30 | 50 | 100 | 50 | 30 |
| | Light transmittance in XY (%) | <0.01 | <0.01 | <0.01 | <0.01 | <0.01 | <0.01 | 14 | <0.01 |
| | Light transmittance in Z (%) | <0.01 | <0.01 | <0.01 | <0.01 | <0.01 | <0.01 | <0.01 | <0.01 |
| Ease of processing | | Good | Good | Good | Good | Good | Good | Good | Poor |

As shown in Table 1, in Examples 1 to 6, using substrates that were less than 75 μm thick, PSA sheets were obtained, each having both XY-directional and Z-directional light transmittances of 0.04% or lower. The PSA sheets of these Examples were easy to process. Because of the low light transmittance values, they are also expected to provide excellent light-blocking properties in the in-plane and thickness directions. On the other hand, in Example 7, the Z-directional light transmittance was reduced to a comparable level to Examples 1 to 6, but the XY-directional light transmittance was high with 14%. With respect to the substrate-free PSA sheet of Example 8, the XYZ-directional light transmittances were reduced with the black colorant in the PSA layer, but it performed poorly in the evaluation of ease of processing.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
10 support substrate (substrate film)
10A first face
10B second face
21 first PSA layer
21A first adhesive face
22 second PSA layer
22A second adhesive face
31, 32 release liners

What is claimed is:

1. A liquid crystal display having a liquid crystal display module unit, a backlight module unit, and an adhesively double-faced pressure-sensitive adhesive sheet joining the liquid crystal display module unit and the backlight module unit, wherein the pressure-sensitive adhesive sheet comprises a support substrate having a thickness less than 75 μm, a first pressure-sensitive adhesive layer placed on a first face of the support substrate and a second pressure-sensitive adhesive layer placed on a second face of the support substrate, the first pressure-sensitive adhesive layer includes a tackifier resin in an amount of 10 parts by weight or greater and 30 parts by weight or less to 100 parts by weight of a base polymer of the first pressure-sensitive adhesive layer, the second pressure-sensitive adhesive layer includes a tackifier resin in an amount of 10 parts by weight or greater and 30 parts by weight or less to 100 parts by weight of a base polymer of the second pressure-sensitive adhesive layer, the first and second pressure-sensitive adhesive layers include, as the tackifier resin, a terpene phenolic resin having a softening point below 130° C., the first and second pressure-sensitive adhesive layers each has a thickness of 20 μm or less, the first and second pressure-sensitive adhesive layers each has a light transmittance of 4.0% or lower in the Z direction, and the pressure-sensitive adhesive sheet has light transmittances of 0.04% or lower in XY and Z directions thereof, wherein the XY direction is a direction n included in the plane of the pressure-sensitive adhesive sheet, and the Z direction is the direction running through the thickness of the pressure-sensitive adhesive sheet.

2. The liquid crystal display according to claim 1, wherein the support substrate is a resin film substrate comprising a black colorant.

3. The liquid crystal display according to claim 1, wherein the pressure-sensitive adhesive layer comprise a black colorant.

4. The liquid crystal display according to claim 1, wherein the light transmittance in the Z direction of the support substrate is 1% or higher and the light transmittance in the Z direction of the pressure-sensitive adhesive layers is 1% or higher.

5. A pressure-sensitive adhesive sheet that comprises a support substrate having a thickness less than 75 μm and a pressure-sensitive adhesive layer placed at least on one face of the support substrate, the pressure-sensitive adhesive layer includes a tackifier resin in an amount of 10 parts by weight or greater and 30 parts by weight or less to 100 parts by weight of a base polymer of the pressure-sensitive adhesive layer, and the pressure-sensitive adhesive layer includes, as the tackifier resin, a terpene phenolic resin having a softening point below 130° C., the pressure-sensitive adhesive layer has a thickness of 20 μm or less, the pressure-sensitive adhesive layer has a light transmittance of 4.0% or lower in the Z direction, wherein the pressure-sensitive adhesive sheet has light transmittances of 0.04% or lower in XY and Z directions thereof, wherein the XY direction is a direction n included in the plane of the pressure-sensitive adhesive sheet, and the Z direction is the direction running through the thickness of the pressure-sensitive adhesive sheet.

6. The pressure-sensitive adhesive sheet according to claim 5, wherein the light transmittance in the XY direction is 0.01% or lower.

7. The pressure-sensitive adhesive sheet according to claim 5, wherein the light transmittance in the Z direction is 0.01% or lower.

8. The pressure-sensitive adhesive sheet according to claim 5, wherein the support substrate has a light transmittance of 5.0% or lower in its Z direction.

9. The pressure-sensitive adhesive sheet according to claim 5, wherein the support substrate comprises a black colorant.

10. The pressure-sensitive adhesive sheet according to claim 5, wherein the support substrate is a resin film substrate comprising a black colorant.

11. The pressure-sensitive adhesive sheet according to claim 5, wherein the pressure-sensitive adhesive layer comprises a black colorant.

12. The pressure-sensitive adhesive sheet according to claim 5, wherein the pressure-sensitive adhesive layer has a thickness of 1.5 μm to 40 μm.

13. The pressure-sensitive adhesive sheet according to claim 5, used in an electronic device comprising a luminous component.

14. The pressure-sensitive adhesive sheet according to claim 5, used for fixing a component in a portable electronic device.

15. The pressure-sensitive adhesive sheet according to claim 5, wherein the pressure-sensitive adhesive sheet has a peel strength to polyethylene terephthalate of 5 N/25 mm or greater.

16. The pressure-sensitive adhesive sheet according to claim 5, wherein the pressure-sensitive adhesive layer includes a particulate black colorant in an amount of 3.0 parts by weight or greater to 100 parts by weight of a base polymer of the pressure-sensitive adhesive layer, and the particulate black colorant has a mean particle diameter of 10 nm or larger and 500 nm or smaller.

17. The pressure-sensitive adhesive sheet according to claim 5, wherein the pressure-sensitive adhesive layer comprises an acrylic polymer as a base polymer, the acrylic polymer includes, as a monomeric component, an alkyl (meth)acrylate in an amount more than 50% by weight, the alkyl (meth)acrylate is represented by formula (1):

$$CH_2=C(R^1)COOR^2 \qquad (1)$$

wherein $R^1$ in the formula (1) is a hydrogen atom or a methyl group, and $R^2$ is an acyclic alkyl group having 1 to 20 carbon atoms, the acrylic polymer includes, as the monomeric component, an acyclic alkyl group having an acyclic alkyl group with 2 to 4 carbon atoms, in an amount of 50% by weight or more, and the acrylic polymer includes, as the monomeric component, a carboxy group-containing monomer in an amount of 3.2% by weight or more.

18. An electronic device comprising the pressure-sensitive adhesive sheet according to claim 5 and an organic electro-luminescence as luminous component.

* * * * *